(12) United States Patent
Johansson et al.

(10) Patent No.: US 7,878,075 B2
(45) Date of Patent: Feb. 1, 2011

(54) BIOMIMETIC TACTILE SENSOR FOR CONTROL OF GRIP

(75) Inventors: Roland S. Johansson, Umea (SE); Gerald E. Loeb, South Pasadena, CA (US); Nicholas Wettels, Los Angeles, CA (US); Djordje Popovic, Oceanside, CA (US); Veronica J. Santos, Tempe, AZ (US)

(73) Assignee: University of Southern California, Los Angeles, CA (US)

( * ) Notice: Subject to any disclaimer, the term of this patent is extended or adjusted under 35 U.S.C. 154(b) by 259 days.

(21) Appl. No.: 12/122,569

(22) Filed: May 16, 2008

(65) Prior Publication Data

US 2009/0133508 A1 May 28, 2009

Related U.S. Application Data

(60) Provisional application No. 60/939,009, filed on May 18, 2007.

(51) Int. Cl.
*G01L 3/00* (2006.01)
(52) U.S. Cl. .................................. 73/862.046
(58) Field of Classification Search .................
73/862.041–862.046
See application file for complete search history.

(56) References Cited

U.S. PATENT DOCUMENTS

| | | |
|---|---|---|
| 4,306,148 A | 12/1981 | Ringwall et al. |
| 4,481,815 A | 11/1984 | Overton |
| 4,492,949 A | 1/1985 | Peterson et al. |
| 4,521,685 A | 6/1985 | Rebman |
| 4,526,043 A | 7/1985 | Boie et al. |
| 4,555,953 A | 12/1985 | Dario et al. |
| 4,555,954 A | 12/1985 | Kim |
| 4,574,438 A | 3/1986 | Diepers et al. |

(Continued)

FOREIGN PATENT DOCUMENTS

EP  1611841  1/2006

(Continued)

OTHER PUBLICATIONS

Dario P. et al. Ferroelectric Polymer Tactile Sensors with Anthropomorphic Features. Proceedings IEEE International Conference on Robotics and Automation, Washington DC, 1:332-340, 1984.

(Continued)

*Primary Examiner*—Lisa M Caputo
*Assistant Examiner*—Octavia Davis
(74) *Attorney, Agent, or Firm*—McDermott Will & Emery LLP

(57) ABSTRACT

Disclosed is a robust tactile sensor array that mimics the human fingertip and its touch receptors. The mechanical components are similar to a fingertip, with a rigid core surrounded by a weakly conductive fluid contained within an elastomeric skin. It uses the deformable properties of the finger pad as part of the transduction process. Multiple electrodes are mounted on the surface of the rigid core and connected to impedance measuring circuitry within the core. External forces deform the fluid path around the electrodes, resulting in a distributed pattern of impedance changes containing information about those forces and the objects that applied them. Strategies for extracting features related to the mechanical inputs and using this information for reflexive grip control.

30 Claims, 12 Drawing Sheets

U.S. PATENT DOCUMENTS

| | | | |
|---|---|---|---|
| 4,581,491 A * | 4/1986 | Boothroyd | 607/118 |
| 4,584,625 A | 4/1986 | Kellogg | |
| 4,616,511 A | 10/1986 | Gindy et al. | |
| 4,621,533 A | 11/1986 | Gindy | |
| 4,634,917 A | 1/1987 | Dvorsky et al. | |
| 4,640,137 A | 2/1987 | Trull et al. | |
| 4,694,231 A | 9/1987 | Alvite | |
| 4,709,342 A * | 11/1987 | Hosoda et al. | 702/138 |
| 4,712,037 A | 12/1987 | Verbeek et al. | |
| 4,745,812 A | 5/1988 | Amazeen et al. | |
| 4,747,313 A | 5/1988 | Okada | |
| 4,813,732 A | 3/1989 | Klem | |
| 4,814,562 A | 3/1989 | Langston | |
| 4,817,440 A | 4/1989 | Curtin | |
| 4,866,412 A | 9/1989 | Rzepczynski | |
| 4,886,361 A | 12/1989 | Furstenau | |
| 4,964,302 A | 10/1990 | Grahn et al. | |
| 4,980,646 A * | 12/1990 | Zemel | 324/716 |
| 5,010,774 A | 4/1991 | Kikuo et al. | |
| 5,014,224 A | 5/1991 | Hans | |
| 5,033,291 A | 7/1991 | Podoloff et al. | |
| 5,060,527 A * | 10/1991 | Burgess | 73/862.68 |
| 5,138,216 A | 8/1992 | Woodruff et al. | |
| 5,200,679 A | 4/1993 | Graham | |
| 5,209,126 A | 5/1993 | Grahn | |
| 5,225,959 A | 7/1993 | Stearns | |
| 5,237,879 A | 8/1993 | Speeter | |
| 5,261,266 A | 11/1993 | Lorenz et al. | |
| 5,311,779 A * | 5/1994 | Teruo | 73/726 |
| 5,313,840 A | 5/1994 | Chen et al. | |
| 5,373,747 A | 12/1994 | Ogawa et al. | |
| 5,510,812 A | 4/1996 | O'Mara et al. | |
| 5,563,354 A | 10/1996 | Kropp | |
| 5,604,314 A | 2/1997 | Grahn | |
| 5,760,530 A | 6/1998 | Kolesar | |
| 5,886,615 A | 3/1999 | Burgess | |
| 5,905,430 A | 5/1999 | Yoshino et al. | |
| 5,905,485 A | 5/1999 | Podoloff | |
| 5,965,880 A | 10/1999 | Wolf et al. | |
| 5,983,725 A | 11/1999 | Fischer et al. | |
| 6,003,390 A | 12/1999 | Cousy | |
| 6,007,728 A | 12/1999 | Liu et al. | |
| 6,067,862 A | 5/2000 | Murray et al. | |
| 6,154,580 A | 11/2000 | Kuriyama et al. | |
| 6,163,739 A | 12/2000 | Park et al. | |
| RE37,065 E | 2/2001 | Grahn | |
| 6,188,331 B1 | 2/2001 | Zee et al. | |
| 6,231,520 B1 | 5/2001 | Maezawa | |
| 6,286,226 B1 | 9/2001 | Jin | |
| 6,443,509 B1 | 9/2002 | Levin et al. | |
| 6,445,284 B1 | 9/2002 | Cruz-Hernandez et al. | |
| 6,529,122 B1 | 3/2003 | Magnussen et al. | |
| 6,584,217 B1 | 6/2003 | Lawless et al. | |
| 6,593,756 B1 | 7/2003 | Schmidt et al. | |
| 6,622,575 B1 | 9/2003 | Nagata | |
| 6,769,313 B2 | 8/2004 | Weiss | |
| 6,848,320 B2 | 2/2005 | Miyajima et al. | |
| 6,871,395 B2 | 3/2005 | Scher et al. | |
| 6,886,415 B1 | 5/2005 | Kurogi et al. | |
| 6,888,537 B2 | 5/2005 | Benson et al. | |
| 6,898,299 B1 | 5/2005 | Brooks | |
| 6,915,701 B1 | 7/2005 | Tarler | |
| 6,955,094 B1 | 10/2005 | Tarler | |
| 6,996,456 B2 | 2/2006 | Cordell et al. | |
| 7,004,039 B1 | 2/2006 | Ford et al. | |
| 7,006,895 B2 | 2/2006 | Green | |
| 7,066,376 B2 | 6/2006 | Scher et al. | |
| 7,069,791 B2 | 7/2006 | Hashimoto et al. | |
| 7,103,447 B2 | 9/2006 | Di Profio et al. | |
| 7,107,124 B2 | 9/2006 | Green | |
| 7,112,755 B2 | 9/2006 | Kitano et al. | |
| 7,198,908 B2 | 4/2007 | Ochi et al. | |
| 7,209,028 B2 | 4/2007 | Boronkay et al. | |
| 7,324,872 B2 | 1/2008 | Nagasaka | |
| 7,347,110 B1 | 3/2008 | Chen et al. | |
| 7,357,035 B2 | 4/2008 | Liu et al. | |
| 7,361,919 B2 | 4/2008 | Setlak | |
| 7,366,332 B2 | 4/2008 | Shimamura et al. | |
| 7,367,232 B2 | 5/2008 | Vaganov et al. | |
| 7,373,843 B2 | 5/2008 | Ganapathi et al. | |
| 2003/0051561 A1 | 3/2003 | Weiss | |
| 2004/0187071 A1 | 9/2004 | Zhang et al. | |
| 2005/0234292 A1 | 10/2005 | Faulkner et al. | |
| 2005/0239191 A1 | 10/2005 | Prins | |
| 2006/0115348 A1 | 6/2006 | Kramer | |
| 2006/0161225 A1 | 7/2006 | Sormann et al. | |
| 2006/0175770 A1 | 8/2006 | Linzell | |
| 2007/0060815 A1 | 3/2007 | Martin et al. | |
| 2007/0227267 A1 | 10/2007 | Loeb et al. | |
| 2007/0265515 A1 | 11/2007 | Brister et al. | |

FOREIGN PATENT DOCUMENTS

| | | |
|---|---|---|
| EP | 1626331 | 2/2006 |
| EP | 1633248 | 3/2006 |
| EP | 1835380 | 9/2007 |
| EP | 1835552 | 9/2007 |
| EP | 1901048 | 3/2008 |
| EP | 1942323 | 7/2008 |

OTHER PUBLICATIONS

Howe R.D. et al. Sensing Skin Acceleration for Slip and Texture Perception. Proceedings IEEE International Conference on Robotics and Automation, Scotsdale, AZ, 1:145-150, 1989.

Howe R.D. et al. Dynamic Tactile Sensing: Perception of Fine Surface Features with Stress Rate Sensing. IEEE Transactions on Robotics and Automation, 9(2):140:151, 1993.

Johansson R.S. et al. Responses of Mechanoreceptive Afferent Units in the Glabrous Skin of the Human Hand to Sinusoidal Skin Displacements. Brain Research, 244(1):17-25, 1982.

Johnson K.O. Neural mechanisms of tactual form and texture perception. Annual Review Neruroscience, 15:277-50, 1992.

Mountcastle V.B. et al. Detection Thresholds for Stimuli in Humans and Monkeys: Comparison with Threshold Events in Mechanoreceptive Afferent Nerve Fibers Innervating the Monkey Hand. Journal of Neurophysiology, 35:122-136, 1972.

Son J.S. et al. A Tactile Sensor for Localizing Transient Events in Manipulation. Proceedings of IEEE International Conference on Robotics and Automation, 1:471-476, 1994.

Westling G. et al. Factors Influencing the Force Control During Precision Grip. Experimental Brain Research, 53(2):277-84,1984.

Yamada Y. et al. Tactile Sensor with 3-Axis Force and Vibration Sensing Functions and its Application to Detect Rotational Slip. Proceedings IEEE International Conference on Robotics and Automation, San Diego, 4:3550-3557, 1994.

International Search Report for PCT Application Serial No. PCT/US08/63985, mailed on Jan. 16, 2009.

Beccai, L. Design and fabrication of a hybrid silicon three-axial force sensor for biomechanical applications Sensors and Actuators A: Physical. vol. A120, No. 2: 370-382. May 17, 2005.

Beebe, D. et al. A silicon force sensor for robotics and medicine. Sensors and Actuators A 50:55-65, 1995.

Birznieks, I., et al. Encoding of direction of fingertip forces by human tactile afferents. Journal of Neuroscience. 21:8222-8237, 2001.

Bloor, D. et al. A metal-polymer composite with unusual properties. Journal of Physics D: Applied Physics, 38: 2851-2860, 2005.

Butterfass, J. et al. DLR-Hand II: Next generation of a dexterous robot hand. Proceedings of the IEEE International Conference on Robotics and Automation. pp. 109-114, 2001.

Cole, K.J. et al. Friction at the digit-object interface scales the sensory-motor transformation for grip responses to pulling loads. Experimental Brain Research, 95:523-532, 1993.

Dalmia, A. et al. Electrochemical behavior of gold electrodes modified with self-assembled monolayers with an acidic end group for selective detection of dopamine. Journal of Electrochemistry, 430: 205-214, 1997.

Flanagan, J.R. et al. Control of fingertip forces in multi-digit manipulation. Journal of Neurophysiology. 81:1706-1717, 1999.

Gordon, A. et al. Memory representation underlying motor commands used during manipulation of common and novel objects, Journal of Neurophysiology 69: 1789-1796, 1993.

Helsel, M et al. An impedance tomographic tactile sensor. Sensor and Actuators. vol. 14, No. 1, pp. 93-98. 1988.

Hornik, K. et al. Multilayer feed forward networks are universal approximators. Neural Networks, 2(5):359-366, 1989.

Johansson, R.S. et al. Roles of glabrous skin receptors and sensorimotor memory in automatic control of precision grip when lifting rougher or more slippery objects. Experimental Brain Research. 56:550-564, 1984.

Johansson, R.S. et al. Signals in tactile afferents from the fingers eliciting adaptive motor responses during precision grip. Experimental Brain Research. 66:141-154, 1987.

Johansson, R.S. et al. Somatosensory control of precision grip during unpredictable pulling loads. I Changes in load force amplitude, Experimental Brain Research 89: 181-191, 1992.

Johansson, R.S. et al. Somatosensory control of precision grip during unpredictable pulling loads. II Changes in load force rate, Experimental Brain Research 89: 192-203, 1992.

Johansson, R.S. et al. First spikes in ensembles of human tactile afferents code complex spatial fingertip events. Nature Neuroscience 7:170-177, 2004.

Kenaley, G. et al. Electrorheological fluid-based robotic fingers with tactile sensing. Proceedings of IEEE International Conference on Robotics and Automation 1:132-136, 1989.

Lee, M.H. et al. Tactile sensing for mechatronics—a state of the art survey. Mechatronics 9:1-31 1999.

Lee, Y.K. et al. Mechanical properties of calcium phosphate based dental filling and regeneration materials Journal of Oral Rehabilitation 30; 418-425, 2003.

Loeb, G.E. et al. Design and fabrication of an experimental cochlear prosthesis. Med. & Biol. Engng. & Comput. 21:241-254, 1983.

Loeb, G.E. et al. Microminiature molding techniques for cochlear electrode arrays. J. Neurosci. Meth. 63:85:92, 1995.

Mei, T. et al. An integrated MEMS three-dimensional tactile sensor with large force range. Sensor and Actuators 80:155-162, 2000.

Merrill, D. et al. Electrical stimulation of excitable tissue: design of efficacious and safe protocols. Journal of Neuroscience Methods, 141: 171-198, 2005.

Mukaibo, Y. et al. Development of a texture sensor emulating the tissue structure and perceptual mechanism of human fingers. Proc. of the 2005 IEEE International Conference on Robotics and Automation, pp. 2576-2581, 2005.

Piela, B. et al. Capacitance of the gold electrode in 0.5 M sulfuric acid solution: AC impedance studies. Journal of Electrochemistry, 388: 69-79, 1994.

Russell, R.A. et al. Sensing surface shape by touch. IEEE International Conference on Robotics and Automation. vol. 1 423-428, 1993.

Vasarhelyi ,G. et al. Effects of the elastic cover on tactile sensor arrays. Sensors and Actuators 132:245-251, 2006.

Voyles, R. et al. Design of a modular tactile sensor and actuator based on an electrorheological gel. Proceedings of IEEE International Conference on Robotics and Automation 1:132-136, 1989.

Westling, G. et al. Responses in glabrous skin mechanoreceptors during precision grip in humans. Experimental Brain Research. 66:128-140, 1987.

Yamada, D. et al. Artificial Finger Skin having ridges and distributed tactile sensors used for grasp force control, Proc. IEEE/RSJ International Conference on Intelligent Robots and Systems, pp. 686-691, 2001.

Brockett, R.W. Robotic Hands With Rheological Surfaces. Proceedings of the IEEE Conference on Robotics and Automaton, Philadelphia, PA, pp. 942-946 (1985).

Grupen R.A., et al. A Survey of General- Purpose Manipulation The International Journal of Robotics Research; 8; 38 (1989).

Howe, R.D. Tactile Sensing and Control of Robotic Manipulation. in Journal of Advanced Robotics, vol. 8, No. 3, pp. 1-30 (1994).

Hristu, D. et al. The performance of a deformable membrane tactile sensor: basic results on geometrically-defined tasks. Proc of the IEEE International Conference on Robotics & Automation San Francisco, California (2000).

Melchiorri, C. Tactile Sensing for Robotic Manipulation. in Ramsete: Lecture Notes in Control and Information Sciences vol. 270, pp. 75-102, Springer Berlin (2001).

Russell, R. A. A Tactile Sensor Skin for Measuring Surface Contours. in: Proc. IEEE Region 10 Int. Conf. on Technology Enabling Tomorrow: Computers, Communications and Automation towards the 21st Century, Melbourne, pp. 262-266 (1992).

Shimojo, M. et al. A Tactile Sensor Sheet Using Pressure Conductive Rubber With Electrical-Wires Stitched Method. IEEE Sensor Journal, vol. 4, No. 5, pp. 589-596, (2004).

Yamada, Y. et al. Tactile Sensor with 3-Axis Force and Vibration Sensing Functions and Its Application to Detect Rotational Slip. Proc of International Conference on Robotics and Automation, pp. 3550-3557, San Diego, CA (1994).

International Search Report for PCT Application Serial No. PCT/US09/39354, mailed on May 28, 2009.

International Search Report for PCT Application Serial No. PCT/US09/39357, mailed on May 29, 2009.

* cited by examiner

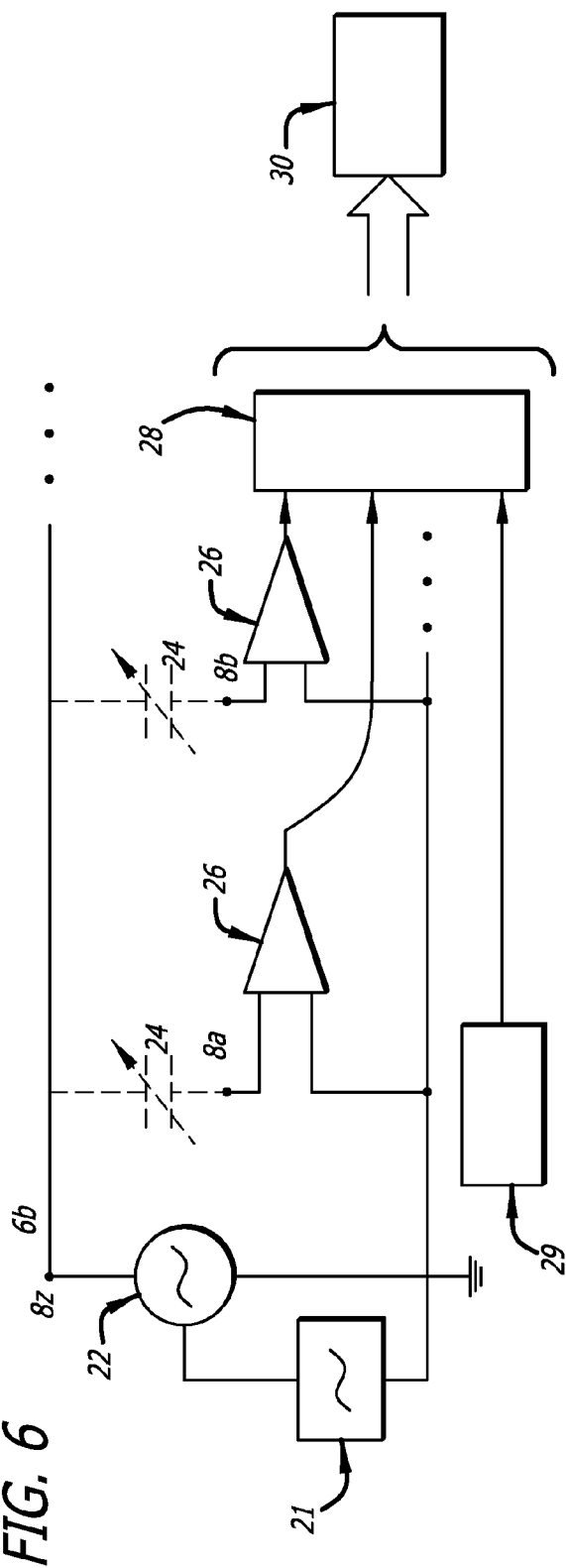
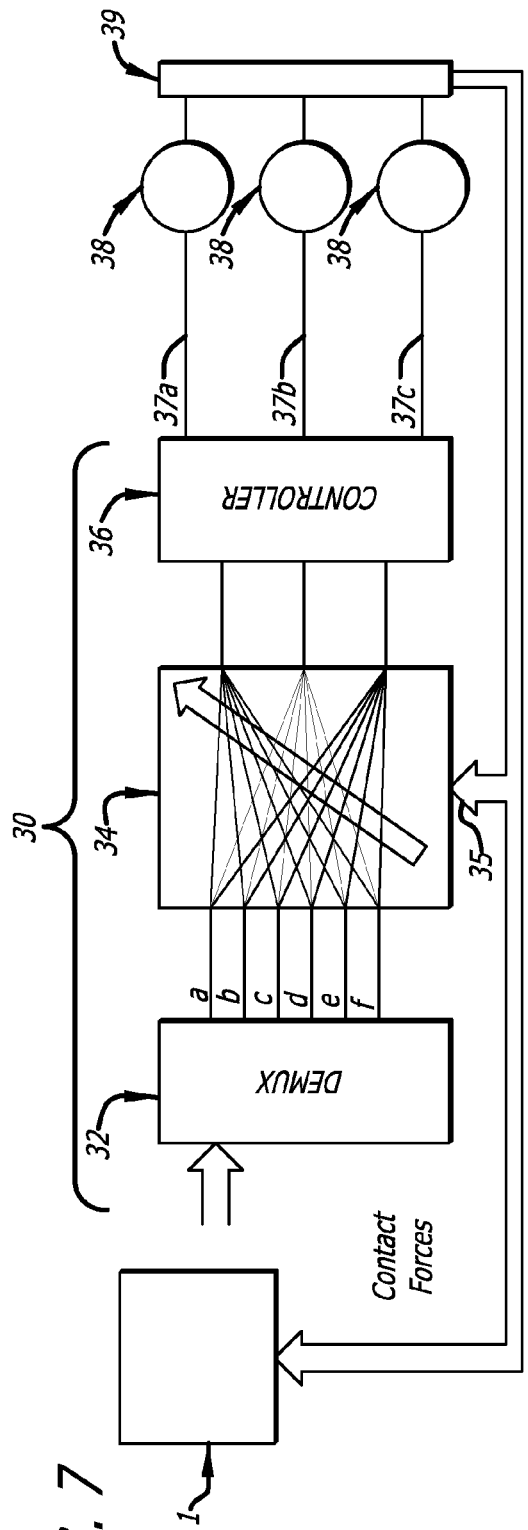
FIG. 6
FIG. 7

BIOMIMETIC TACTILE SENSOR FOR CONTROL OF GRIP

CROSS REFERENCE TO RELATED APPLICATIONS

This patent application is related to U.S. patent application Ser. No. 11/692,718 entitled "Biomimetic Tactile Sensor" filed Mar. 28, 2007 (now U.S. Pat. No. 7,658,229, issued Feb. 9, 2010). This application also claims the benefit of the filing date of U.S. provisional application Ser. No. 60/939,009 filed May 18, 2007, entitled "Biomimetic Tactile Sensor for Control of Grip." The content of both of these applications is incorporated herein by reference.

STATEMENT REGARDING FEDERALLY SPONSORED RESEARCH

This invention was made with government support under Contract No. 907959, awarded by the Defense Advanced Research Projects Agency (DARPA). The government has certain rights in the invention.

BACKGROUND

1. Field

This application relates generally to devices and methods to provide a set of sensory feedback information capabilities from robotic or prosthetic finger tips comparable to those provided by the human skin.

2. General Background and State of the Art

Present generations of robots lack most of the sensorial abilities of humans. This limitation prevents industrial robots from being used to carry on delicate tasks of enormous practical relevance (such as assembly operations) and, even more, it prevents the development of evolved robots for off-factory jobs (agriculture, home, assistance to the disabled, etc). Future generations of robots may be increasingly featured by the massive use of dedicated sensors that will enhance substantially the limited ability of present robots to interact with the external world. Taction, vision and proximity are the sensory needs that, in combination or alone, are commonly accepted as desirable features of robots. Research on visual pattern recognition received considerable attention in recent years. Tactile recognition (the ability to recognize objects by manipulation) is an inherently active process. Unlike visual sensors (passive and located remotely from the object), tactile sensors must be put in contact with the object to be recognized and, even more, such contact should be competently organized in order to extract the maximum degree of information from manipulative acts.

Humans who have suffered amputations of their hands and arms are generally provided with prosthetic limbs. Increasingly these prosthetics incorporate electromechanical actuators to operate articulations similar to biological joints, particularly to control the fingers to grasp and hold objects. Recent research has revealed how arrays of biological tactile receptors distributed throughout the soft tissues of the finger tip are used normally by the nervous system to provide rapid adjustments of grip force. Due to limitations in currently available tactile sensing technology discussed below, currently available prosthetic fingers provide little or no sensing capabilities and cannot make use of these highly effective biological control strategies.

Tactile sensors are generally known and can be grouped into a number of different categories depending upon their constructions, the most common groups are piezoresistive, piezoelectric, capacitive and elastoresistive structures. The common feature of all of these devices is the transduction of local asperities (unevenness or a projection from a surface) into electrical signals. Tactile sensors are commonly used in the field of robotics and in particular with those robotic devices which pick up and place objects in accordance with programmed instructions; the so-called "pick and place" class of robot. Unfortunately, while it would be desirable for the above-listed groups of tactile sensors to respond in much the same way that the human finger does, many of them can provide only limited information about a contact with an object. This requires large numbers of separate structures or electrical characteristics that require extensive circuitry in order to obtain an output indicative of the surface which has been contacted. For robotics, the difficulties associated with their non-linear response mechanisms, their fragile structure, and the high cost of assembling many discrete components limits their use of the above groups in an industrial environment. There are difficulties with calibration, environmental survivability, and other factors which render them less than optimal for many applications in less restricted environments, particularly those associated with motor-actuated prosthetic hands and telerobotic systems intended to augment human performance.

The performance of prosthetic hands and robotic manipulators is severely limited by their having little or no tactile information compared to the human hand. A wide variety of technologies have been applied to solve the tactile sensing problem in robotics and medicine. Transduction mechanisms such as optics, capacitance, piezoresistance, ultrasound, conductive polymers, etc. have all yielded viable solutions but only for limited environments or applications. For example, most MEMS sensors provide good resolution and sensitivity, but lack the robustness for many applications outside the laboratory [1-3] (see text, infra, for citations to notes). Beebe et al. proposed piezoresistive silicon based MEMS sensor with a high tensile strength, but hysteresis and inability to sense shear force posed limitations [4]. Conductive particles suspended in elastomers can result in elastic materials whose resistivity changes with deformation. A recent enhancement of such materials called Quantum Tunneling Composites (QTC) greatly increases sensitivity and dynamic range but at the expense of mechanical hysteresis and simultaneous sensitivity to temperature and absorption of gases [5].

The curved, deformable nature of biological finger tips provides mechanical features that are important for the manipulation of the wide variety of objects encountered naturally. Multi-axis force sensing arrays have been fabricated using MEMS but they are not suitable for mounting on such surfaces or for use in environments that include heavy loads, dust, fluids, sharp edges and wide temperature swings [2, 3]. If skin-like elastic coverings are placed on top of sensor arrays, they generally desensitize the sensors and function as low pass temporal and spatial filters with respect to incident stimuli [6].

SUMMARY

The present biomimetic tactile sensor may possess softness, elasticity and some mechanical resistance that mimics natural human skin. Furthermore, it may detect and discriminate various aspects of contact with external objects, including the direction and magnitude of force, the extent and shape of the object, and small movements associated with impending slip.

An exemplary embodiment comprises a device through which a set of information is generated concerning tactile interaction between a manipulator and an object to be manipulated and recognized. The tactile information may be generated either by robot or prosthetic finger tips. A key feature of the embodiment may be that it confers a very high sensitivity to incremental changes in the distribution of pressure.

The sensory device may have a biomimetic shape of the core and covering skin and pulp that results in distinctive and readily detectable patterns of impedance changes across an array of electrodes disposed on the core, to take advantage of the various distortions of the pulp produced by the contact parameters to be detected and discriminated. Because of the overall biomimetic design of the sensor assembly, the stimulus features that may be most readily detected by the feature extraction circuitry are those features that may be most useful for automatic adjustment of contact force to achieve and maintain stable and efficient grasp of an object. Features of disclosed sensory devices that may be associated with this strategy include the complex mechanical contours of the core, the elasticity and points of attachment of the investing skin, the specific shapes and dispositions of the electrodes on the core surface, conditions of use in which at least some electrodes are nearly or completely occluded by direct contact with the overlying skin, and the extraction of information from complex temporospatial patterns of impedance changes among those electrodes using trainable algorithms such as neural networks.

Exemplary sensory devices may also include a sensor assembly whose basic form and function are similar to that of a human finger tip. A prosthetic hand or anthropomorphic robotic manipulandum could combine several such finger tips at the ends of appendages whose movements may be controlled by actuators. Similar padlike structures with sensors might also be deployed on grip contact surfaces akin to the palmar eminences over the heads of the metacarpal bones etc. One or more such sensor assemblies could be built with various sizes and shapes and mounted in varying numbers and positions on a variety of manipulanda, locomotor supports and other mechanical apparatus that must interact with external objects and surfaces according to information derived from contact sensors.

One embodiment of the present device may consist of a set of sensors that work by measuring the electrical impedance among a plurality of electrodes. The electrodes may be deployed on a substantially rigid core that is protected from direct contact with external objects by overlying deformable structures. A feature of this design may be the location of mechanically vulnerable connections between the electrodes and the signal processing circuitry, which are wholly contained within the substantially rigid core. A related feature may be that this design enables methods of manufacture and repair that are simple and efficient.

The plurality of sensors and their associated mechanical structures have similarities to the biological relationships among the cutaneous neural receptors, the distal phalanx, overlying finger pulp and covering skin and nail. Information may be extracted from such a plurality of sensors whereby such information can be related to canonical physical representations used to describe stimuli to be sensed, and/or used to control automatic adjustments of grip forces similar to the neural reflexes whereby humans maintain stable grip on complex objects.

One embodiment of present device may consist of a biomimetic tactile sensor that is sensitive to the wide range of normal and shear forces encountered in robotic and prosthetic applications.

It is understood that other embodiments of the biomimetic tactile sensor systems and methods will become readily apparent to those skilled in the art from the following detailed description, wherein it is shown and described only exemplary embodiments by way of illustration. As will be realized, the biomimetic tactile sensor systems and methods are capable of other and different embodiments and its several details are capable of modification in various other respects. Accordingly, the drawings and detailed description are to be regarded as illustrative in nature and not as restrictive.

BRIEF DESCRIPTION OF THE DRAWINGS

FIG. 6 shows a schematic of the electronic system for signal detection for a tactile sensor array that employs variable-capacitance sensing.

FIG. 7 shows a schematic of a neural network trained to adjust grip forces according to feedback from the tactile sensor.

DETAILED DESCRIPTION

Figure 1:
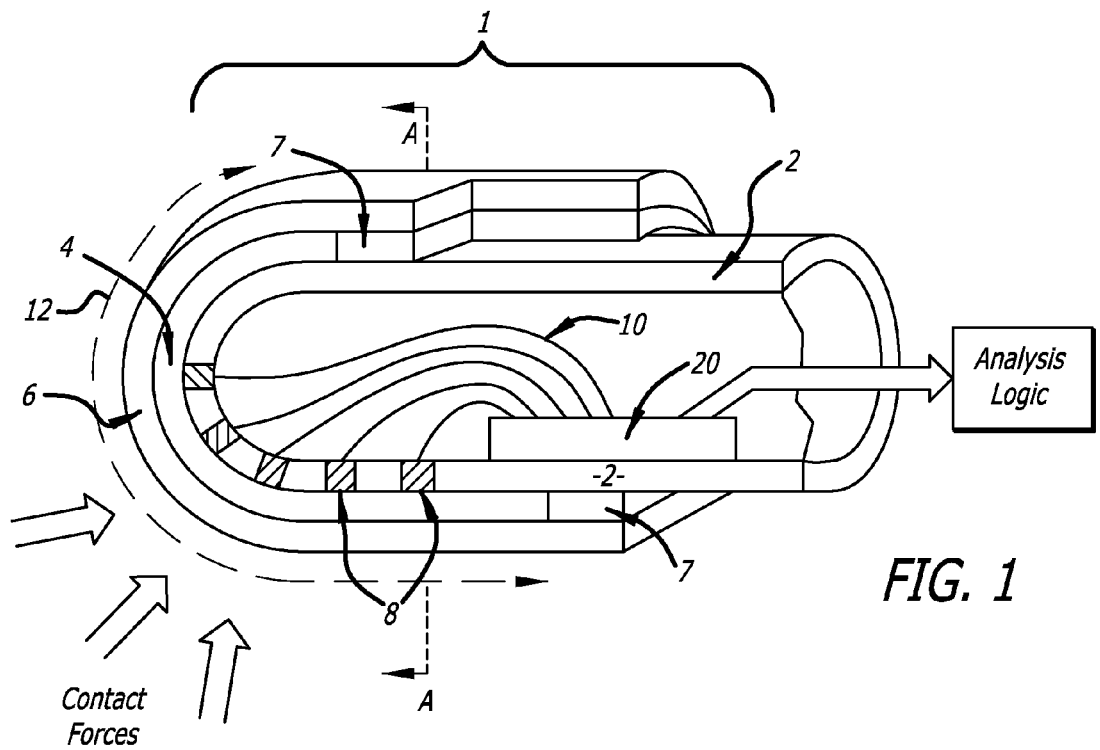
FIG. 1 shows a longitudinal cross-section of a tactile sensor in the form of a finger pad.

The detailed description set forth below is intended as a description of exemplary embodiments of the tactile sensory system and method and is not intended to represent the only embodiments in which the biomimetic tactile sensor systems and methods can be practiced. The term "exemplary" used throughout this description means "serving as an example, instance, or illustration," and should not necessarily be construed as preferred or advantageous over other embodiments. The detailed description includes specific details for the purpose of providing a thorough understanding of the tactile sensory systems and methods. However, it will be apparent to those skilled in the art that the tactile sensory systems and methods may be practiced without these specific details. In some instances, well-known structures and devices are shown in block diagram form in order to avoid obscuring the concepts of the tactile sensory systems and methods.

The following articles are referred to through out the disclosure and their contents are incorporated by reference. [1] Lee M. H., Nichols H. R., Tactile sensing for mechatronics—a state of the art survey. Mechatronics 9:1-31 1999. [2] Beccai L., Design and fabrication of a hybrid silicon three-axial force sensor for biomechanical applications Sensors and Actuators A: Physical. Vol. A120, no. 2: 370-382. 17 May 2005. [3] Mei T. Et al. An integrated MEMS three-dimensional tactile sensor with large force range. Sensor and Actuators 80:155-162, 2000. [4] Beebe D., Hsieh, Denton D., Radwin R. A silicon force sensor for robotics and medicine. Sensors and Actuators A 50:55-65, 1995. [5] Bloor D., Donnely K., Hands P. J., Laughlin P., Lussey D. A metal-polymer composite with unusual properties. Journal of Physics D: Applied Physics, 38: 2851-2860, 2005. [6] Vasarhelyi G., Adam M., Vazsonyi E., Barsony I., Ducso C. Effects of the elastic cover on tactile sensor arrays. Sensors and Actuators 132:245-251, 2006. [7] Helsel, M; Zemel, J N; Dominko, V An impedance tomographic tactile sensor. Sensor and Actuators. Vol. 14, No. 1, pp. 93-98.1988. [8] Russell, R. A. Parkinson, S. Sensing surface shape by touch. IEEE International Conference on Robotics and Automation. Vol. 1 423-428, 1993. [9] Kenaly G., Cutkosky M. Electrorheological fluid-based robotic fingers with tactile sensing. Proceedings of IEEE International Conference on Robotics and Automation 1:132-136, 1989. [10] Voyles R., Fedder G., Khosla P. Design of a modular tactile sensor and actuator based on an electrorheological gel. Proceedings of IEEE International Conference on Robotics and Automation 1:132-136, 1989. [11] Lee Y. K., Lim, B. S., Kim, C. W. Mechanical properties of calcium phosphate based dental filling and regeneration materials Journal of Oral Rehabilitation 30; 418-425, 2003. [12] D. Merrill, M. Bikson, J. Jeffreys, Electrical stimulation of excitable tissue: design of efficacious and safe protocols. Journal of Neuroscience Methods, 141: 171-198, 2005. [13] A. Dalmia, C. C. Liu, R. F. Savinell Electrochemical behavior of gold electrodes modified with self-assembled monolayers with an acidic end group for selective detection of dopamine. Journal of Electrochemistry, 430: 205-214, 1997. [14] B. Piela, P. Wrona, Capacitance of the gold electrode in 0.5 M sulfuric acid solution: AC impedance studies. Journal of Electrochemistry, 388: 69-79, 1994. [15] Johansson R., Riso R., Hager C. and Backstrom L. Somatosensory control of precision grip during unpredictable pulling loads. I Changes in load force amplitude, Experimental Brain Research 89: 181-191, 1992. [16] Birznieks I., Jenmalm P., Goodwin A. W., Johansson R. S. Encoding of direction of fingertip forces by human tactile afferents. Journal of Neuroscience. 21:8222-8237, 2001. [17] Flanagan J. R., Burstedt M. K. O., Johansson R. S. Control of fingertip forces in multi-digit manipulation. Journal of Neurophysiology. 81:1706-1717, 1999. [18] Johansson R. S., Westling G. Roles of glabrous skin receptors and sensorimotor memory in automatic control of precision grip when lifting rougher or more slippery objects. Experimental Brain Research. 56:550-564, 1984. [19] Johansson R. S., Westling G. Signals in tactile afferents from the fingers eliciting adaptive motor responses during precision grip. Experimental Brain Research. 66:141-154, 1987. [20] Westling G., Johansson R. S. Responses in glabrous skin mechanoreceptors during precision grip in humans. Experimental Brain Research. 66:128-140, 1987. [21] K. Hornik, M. Stinchcombe, and H. White. Multilayer feed forward networks are universal approximators. Neural Networks, 2(5): 359-366, 1989. [22] Park, J. and 1. Sandberg, Approximation and radial-basis-function networks, Neural Computation 5, 305-316, 1993. [23] Caudill, M.; Butler, C. Understanding Neural Networks: Computer Explorations; Volume 1: Basic Networks; The MIT Press; Cambridge, Mass., 1992. [24] D. Yamada, T. Maeno and Y. Yamada, Artificial Finger Skin having ridges and distributed tactile sensors used for grasp force control, Proc. IEEE/RSJ International Conference on Intelligent Robots and Systems, pp. 686-691, 2001. [25] Y. Mukaibo, H. Shirado, M. Konyo, T. Maeno Development of a texture sensor emulating the tissue structure and perceptual mechanism of human fingers. Proc. of the 2005 IEEE International Conference on Robotics and Automation, pp. 2576-2581, 2005. [26] Johansson R. S. and Westling G. Role of glabrous skin receptors and sensorimotor memory in automatic control of precision grip when lifting rougher and more slippery objects, Experimental Brain Research 56: 550-564, 1984. [27] Cole K. J., Johansson R. Friction at the digit-object interface scales the sensory-motor transformation for grip responses to pulling loads, Experimental Brain Research, 95: 523-532, 1993. [28] Johansson R., Hager C. and Riso R. Somatosensory control of precision grip during unpredictable pulling loads. II Changes in load force rate, Experimental Brain Research 89: 192-203, 1992. [29] Gordon A., Westling G., Cole K. J. and Johansson R. Memory representation underlying motor commands used during manipulation of common and novel objects, Journal of Neurophysiology 69: 1789-1796, 1993. [30] Johansson R. S., Birznieks I. First spikes in ensembles of human tactile afferents code complex spatial fingertip events. Nature Neuroscience 7:170-177, 2004. [31] Butterfass, J., Grebenstein M., Lui H., Hirzinger G. DLR-Hand II: Next generation of a dexterous robot hand. Proceedings of the IEEE International Conference on Robotics and Automation. pp 109-114, 2001.

It is a general property of biological sensory receptors that they are highly evolved structures in which the receptors themselves and the tissues in which they are located may contain many features designed to enhance their sensitivity and the quantity of information that they can provide to the central nervous system. The skin contains multiple types of mechanoreceptors to transduce a variety of mechanical events that occur during contact with physical objects. These receptors are concentrated in sites such as the finger tips, where their sensitivity is enhanced by the mechanical properties of the skin, underlying pulp and bone, and adjacent fingernails. U.S. Pat. No. 4,980,646, to Zemel, is incorporated herein by reference and teaches a tactile sensor based on changes in the local electrical resistance presented by a layer of weakly conductive fluid whose shape is deformed by external forces applied to a deformable membrane. Zemel describes the application of a voltage gradient across the entire extent of the fluid by means of electrodes arranged on either side of the array of sensing strips, and the measurement of the local strength of that gradient by differential voltage measurements between adjacent pairs of electrode strips. U.S. Pat. No. 4,555,953 to Dario et al., which is incorporated herein by reference in its entirety, teaches different techniques and materials that have been utilized for the construction of artificial skin-like sensors.

The input-output properties of these biological transducers differ generally from engineered transducers. Engineered transducers are usually designed to produce a linear response to a single mechanical variable such as normal or tangential force at a single point. The signals from arrays of such transducers can be combined according to simple, analytical algorithms to extract orthogonal physical parameters of touch such as total force, center of force, directional force vector and two-point resolution. Biological touch receptors are highly nonlinear and non-orthogonal. Their signals are combined by adaptive neural networks to provide subconscious adjustment of motor output as well as high level conscious perception associated with haptic identification of objects. Neurophysiologists and psychologists often correlate the activity of somatosensory receptors and design measures of psychophysical percepts according to canonical physical parameters, but there is little evidence that the nervous system actually extracts direct representations of such parameters as an intermediate stage between sensation and performance. In fact, information theory suggests that such an intermediate representation would add noise and reduce information content, which would place such a strategy at an evolutionary disadvantage. Engineered sensors and their signal processing systems use linear, orthogonal representations because the downstream control systems generally have been based on such inputs. This strategy may work well for engineered systems such as industrial robots that must perform accurately for highly constrained and predictable tasks. It is difficult to apply to anthropomorphic robots and prosthetic limbs that must perform a broad and unpredictable range of tasks associated with activities of daily living. The problem may further be complicated by environmental factors in such environments (e.g. temperature, moisture, sharp edges etc.), which tend to damage or bias sensitive and/or physically exposed transducers.

Exemplary embodiments of the present sensory devices have features comparable to features found in biological systems. In particular, they may use biomimetic mechanical structures similar to those found in the finger tip to endow a set of simple, robust electronic sensors with a wide range of modalities and sensitivities similar to those found in biological mechanoreceptors. An exemplary embodiment may employ a larger number of small, local electrodes deployed in a curved array whose shape and mechanical properties mimic those of a biological finger tip. Each sensing electrode may be energized to provide an independent measure of the local mechanical deformations of the overlying membrane based on its impedance with respect to a remote common electrode. Further improvements are described to enhance the sensitivity and dynamic range of each sensing electrode by contouring the inner surface of the overlying membrane. Yet another exemplary embodiment teaches a novel method of detecting deformation of the membrane by energizing the membrane and detecting the capacitive coupling to each sensing electrode through a dielectric fluid or gas. In further embodiments, neural networks may compute directly the actuator adjustments required to maintain stable grip of objects with a variety of shapes and force vectors in a manner similar to that employed by neural control of the human hand.

Various aspect of the present exemplary biomimetic sensing devices can incorporate features described in the following articles, which are all incorporated herein by reference: Johansson R S, Westling G. ("Signals in tactile afferents from the fingers eliciting adaptive motor responses during precision grip", Experimental Brain Research. 66:141-154, 1987); Westling G, Johansson R S. "Responses in glabrous skin mechanoreceptors during precision grip in humans", Experimental Brain Research. 66:128-140, 1987); Flanagan J R, Burstedt M K O, Johansson R S "Control of fingertip forces in multi-digit manipulation" Journal of Neurophysiology. 81:1706-1717, 1999); Birznieks I, Jenmalm P, Goodwin A W, Johansson R S. "Encoding of direction of fingertip forces by human tactile afferents" Journal of Neuroscience. 21:8222-8237, 2001); Johansson R S, Birznieks "First spikes in ensembles of human tactile afferents code complex spatial fingertip events" Nature Neuroscience 7:170-177, 2004) which are all incorporated by reference in their entirety.

Mechanical Platform

Referring to FIG. 1, the sensor assembly 1 may consist of a substantially rigid central core 2 surrounded by a pulp 4 with fluid, elastic or gel mechanical properties, covered by a skin 6 attached to the core 2 by means of a seal 7 along the perimeter of the pad 12 thereby created. A plurality of electrodes 8 may be deployed on those surfaces of the core 2 whose contact with objects and surfaces is to be sensed, as described below. U.S. Pat. No. 4,980,646 to Zemel discusses an alternative tactile sensor design which may be implemented in embodiments of the present tactile sensors.

The skin 6 may be a deformable and/or elastic material similar to human glabrous skin in its mechanical properties and possessing advantageous properties such as toughness to resist wear, texture and tackiness to improve grip, and colorizable for cosmetics. As described below, it may be advantageous to incorporate bumps, ridges and/or other features into the internal and/or external surface(s) of the skin. Suitable materials may include but are not limited to polymers such as silicone elastomers and polyurethanes, among many others familiar to biomedical engineers and prosthetics. In a preferred embodiment, the core 2 may be made of a mechanically tough material such as zirconia ceramic or titanium metal that can function as part of the mechanical linkage of the prosthesis or robot on which the sensor assembly is deployed. The following references, which are incorporated by reference in their entirety, teach various features that may be utilized in the present tactile sensor devices and methods: U.S. Pat. No. 6,871,395 to Scher et al. teaches connecting electrically conductive elastomer to electronics and U.S. Pat. No. 6,529,122 to Magnussen et al. teaches measuring contact resistance between workpieces, U.S. Pat. No. 5,905,430 to Yoshino et al. for detecting state of contact between a contact member and a workpiece, U.S. Pat. No. 5,033,291 to Podoloff et al. for flexible tactile sensor for measuring foot pressure distributions; U.S. Pat. No. 5,014,224 to Hans for determining location and amount of exerted pressure; U.S. Pat. No. 4,817,440 to Curtin for identifying contact force and the contact pattern; U.S. Pat. No. 4,526,043 to Boie et al. for Conformable tactile sensor; and U.S. Pat. No. 4,481,815 to Overton for determining a parameter of an object being contacted by the tactile sensor.

In one exemplary embodiment, the choice of material for the pulp 4 may be chosen to be a deformable, volume-conductive liquid or gel whose electrical conductivity is sufficiently low that the resistance measured between two or more electrodes in contact with the pulp changes when the pulp is mechanically deformed. Suitable materials may include aqueous and non-aqueous gels with ionic conductors, liquid crystal materials, and many others that would be obvious to one normally skilled in the art. Advantageously, the pulp 4 can be injected through a hypodermic needle into the space between the skin 6 and the core 2 and its electrodes 8 after the skin 6 is attached to the seal 7. This makes it possible to control accurately the thickness and pressure of the pulp 4 and to refurbish the sensor assembly 1 by replacing the skin 6 and/or pulp 4 without affecting the electrodes 8 or detection circuitry 20.

Sensing Elements

Figure 2:
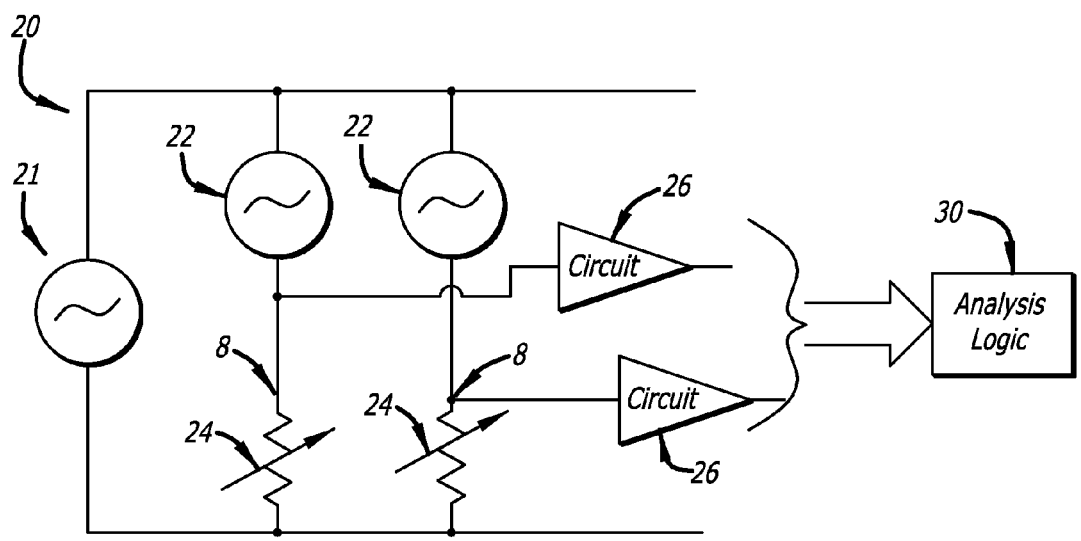
FIG. 2 shows a schematic of the electronic system for signal detection and processing.

Sensing may be accomplished by measuring changes in the electrical impedance among electrodes 8 whose distribution and location on the contoured surface of the core 2 may be a key factor in the sensing properties of the sensor assembly 1. One embodiment of detection circuitry 20 is illustrated schematically in FIG. 2 and described in more detail below. The electrical impedance 24 so measured can be dominated by the thickness and electrical properties of the pulp 4. For some of the various configurations described in more detail below, this may be a resistance that can be measured between a given electrode 8 and other electrodes or reference points and that depends generally on the inverse of the distance between said electrode 8 and the skin 6 immediately overlying said electrode 8. This distance may decrease because of pressure on the overlying skin but increases because of hydrostatic pressure in the viscoelastic pulp 4. If the skin 6 completely occludes an electrode 8, the electrical impedance 24 may become very large and insensitive to further increases in contact force, which may be undesirable. This problem can be mitigated by texturing the inner surface of skin 6. Such texture may be created if skin 6 is formed by the method of dip-coating and polymerization in situ as described below, in which case the surfaces of core 2 and electrodes 8 can be abraded prior to dip-coating to create the desired textured surface.

The sensing assembly 1 may have the greatest sensitivity to a small change in the distribution of pressure in those electrodes that are near the edge of a population of electrodes 8 in which the skin 6 has been compressed against the central electrodes of the population. Such a change may cause electrodes along this edge to change between the states of having a small distance between skin and electrode to having a zero distance, for which the resistance theoretically becomes infinite. Other embodiments are described below in which the impedance measured at an electrode 8 decreases as the distance between the electrode 8 and the skin 6 decreases.

Figure 3:
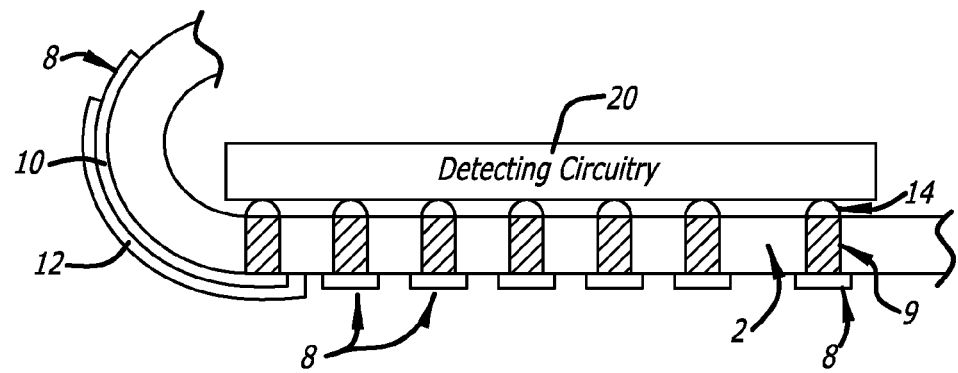
FIG. 3 shows a cross-sectional detail of a scheme for automated routing and connection of electrodes to electronic circuitry.

Each electrode 8 may be electrically insulated from the others and from the overlying pulp 4 except for a specifically defined contact area with the pulp comprising the electrode 8. Each electrode 8 may be connected to detection circuitry 20 by means of a lead 10. This can be accomplished by various feedthroughs and coatings such as are commonly employed in hybrid microelectronic circuits and hermetic packages. FIG. 1 illustrates one embodiment in which the core 2 may be a dielectric material such as zirconia or alumina ceramic and the electrodes 8 consist of metallic vias that pass through laser-drilled holes in the ceramic and are connected to detection circuitry 20 by means of leads 10 consisting of conventional wirebonds. In another embodiment illustrated in FIG. 3, conductive lines may be printed on the outside and/or inside surface of the core 2 providing a means for forming the leads 10 so that the detection circuitry 20 can be connected to the plurality of electrodes 8 by means of a plurality of welds 14 made directly and simultaneously to the backs of conductive feedthrough pins 9 using methods such as flip-chip and ball-grid array bonding, as is well-known in the art. In yet another embodiment, the core 2 may be a metallic material such as titanium, aluminum or stainless steel and the electrodes 8 consist of the external surfaces of metal feedthroughs that pass through holes drilled through the core 2. The electrodes 8 may be held in place by a seal made from a dielectric material such as a melted glass frit that can provide both electrical insulation between the electrodes 8 and a hermetic seal between the liquid component of the pulp 4 and the detection circuitry 20.

Electronic Signal Processing

Detection circuitry 20 may be mounted within a recess in the core 2 that provides mechanical support and protection. As illustrated schematically in FIG. 2, said detection circuitry 20 converts power supply 21 to an energization signal 22 that may be applied to various combinations of electrodes 8. The impedances 24 of the effective circuit between the electrodes 8 through the pulp 4 may be quantified by measurement circuits 26 and reported to analysis logic 30. If the pulp is an electron conductor, then the energization signal 22 can be a direct current or voltage; the measured value may be a direct voltage or current, respectively. The impedance 24 of the volume conductive path through the pulp 4 may be dominated by its resistive component, which can be computed from Ohm's law. If the pulp 4 may be an ionic conductor such as an aqueous solution or gel, then the energization signal 22 may advantageously be an alternating current or voltage that avoids electrolysis and polarization effects on the electrodes 8. The magnitude of the measured alternating voltage or current can be extracted by rectifying and low pass filtering to compute the impedance 24 of the volume conductive path according to Ohm's law.

One alternative mode of operation of the sensor assembly 1 may be to detect small changes in the distribution of pressure, which as noted above that may tend to produce the greatest incremental change in impedances 24 among the subpopulation of electrodes 8 that are in or near contact with the overlying skin 6. The incremental sensitivity of the detection circuitry 20 to such changes may be different for the two modes of measurement just described. If the energization signal 22 is a voltage, then the measured current asymptotically approaches zero as the thickness of the overlying pulp decreases when it is compressed with increasing contact force. If the energization signal 22 is a current, then the measured voltage exponentially may rise toward the compliance voltage of the available power supply as the thickness of the overlying pulp is compressed towards the contact. These two relationships have implications for the detectability of incremental changes by the subsequent feature algorithms of the analysis logic 30 as described below. Any signal detection should cope with the inevitable consequences of electrical noise in the various electrically active and passive components such as are well-known to those normally skilled in the art.

Figure 4:
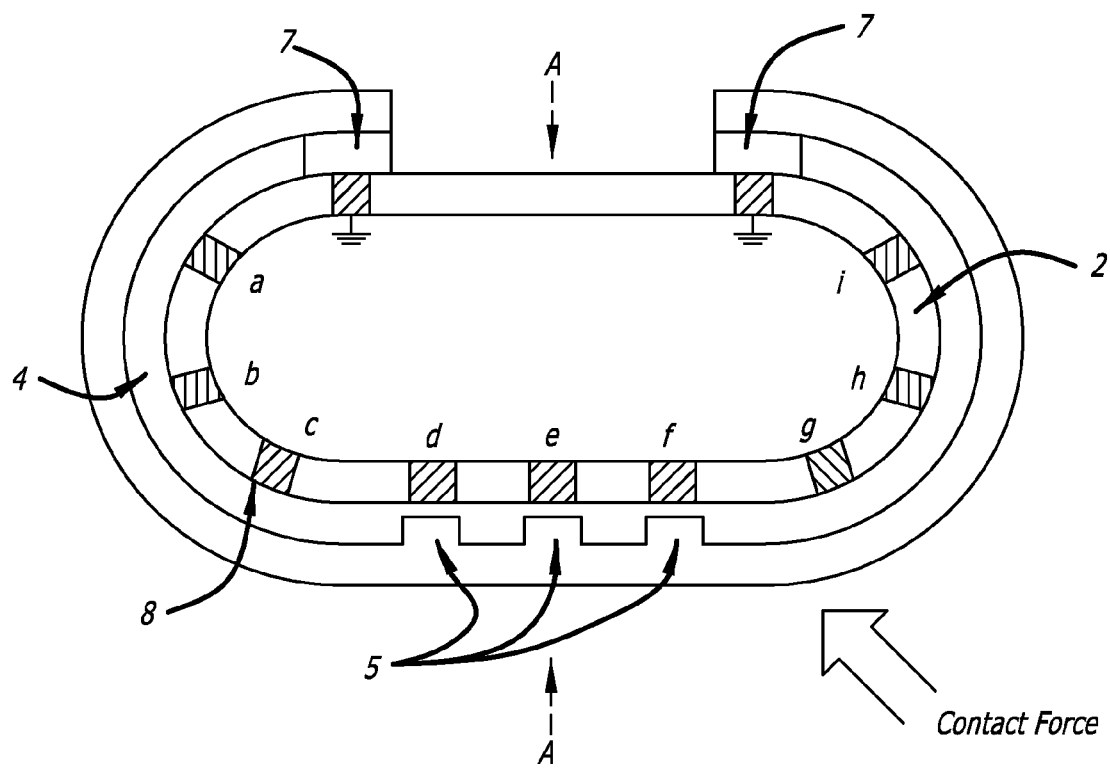
FIG. 4 shows a transverse cross-section of a tactile sensor responding to a typical contact force.

One exemplary configuration for impedance measurement may be between each electrode 8 and a common contact (designated by the ground symbol in FIG. 2) that substantially surrounds all of the electrodes 8. The common contact may be printed photolithographically onto the surface of the core 2 if it is a dielectric material or formed by the core 2 itself if it is a conductive material. Alternatively, the common contact may be formed by conductive material incorporated into the seal 7 surrounding the electrodes 8 as depicted in FIG. 4. Many other configurations can be created dynamically by incorporating electronic switches into the detection circuitry 20. Among these configurations may be differential measurements between a pair of adjacent electrodes 8, measurements between one electrode 8 and all other electrodes connected together by said switches, and differential measurements between various combinations of electrodes 8 selected dynamically by means of said switches.

In yet another exemplary embodiment, the pulp 4 can be a volume conductor with a fairly high resistivity such as 100 (ohm)(cm) and the skin 6 can be a conductor that is connected to the "ground" or reference voltage of the detection circuitry. In this case, the electrical impedance 24 between each electrode 8 and the skin 6 may be approximately proportional to the distance between them, declining rapidly to approximately zero as they actually touch each other. Still other combinations of conductive and dielectric materials for the pulp 4 and skin 6 and related detection circuitry 20 are included within the scope of the system.

In an alternate embodiment, the pulp 4 can be made from a dielectric material and the skin 6 can be an electrical conductor such as a woven metal fabric or metal- or carbon-filled polymer. Suitable dielectric materials for the pulp 4 may include but are not limited to gases such as air, liquids such as mineral oil, and gels such as silicone polymers. In this embodiment, the impedance 24 between each electrode 8 and the overlying skin 6 may be essentially that of a capacitor whose value increases with the inverse of the distance between the electrode 8 and the overlying skin 6. Thus, the mechanical factors in the design and performance of the sensor assembly 1 may be generally similar to those of the first embodiment in which the pulp 4 is a conductor and the skin 6 is a dielectric. The impedance of a capacitor is related inversely to the value of its capacitance and inversely to the frequency of the electrical signal applied to it. In this alternate embodiment, the impedance between any one or more electrodes 8 and the skin 6 may be readily measured by applying an energization signal 22 between them that may be an alternating current or voltage and measuring the alternating voltage or current, respectively. It may generally be advantageous for the skin 6 to be connected to the "ground" or reference voltage for all of the individual detection circuits 20 associated with the various electrodes 8.

In the above alternate embodiment, if such a conductive skin 6 actually touches an electrode 8, the impedance 24 between them may go abruptly to approximately zero because of ohmic conductance between them. If that is not desired, such contact can be prevented and the maximal value of the capacitance between them can be stabilized by coating the inside surface of the conductive skin with a thin and flexible dielectric layer such as poly-paraxylylene (commercial tradename Parylene). If the skin 6 is composed of a woven metal fabric, a vapor-deposited coating of Parylene on both the inside and outside surface of the skin 6 can advantageously be used to seal the fabric so that the dielectric material used for the pulp 4 does not leak out and to avoid making electrical contact with external objects.

Figure 5:
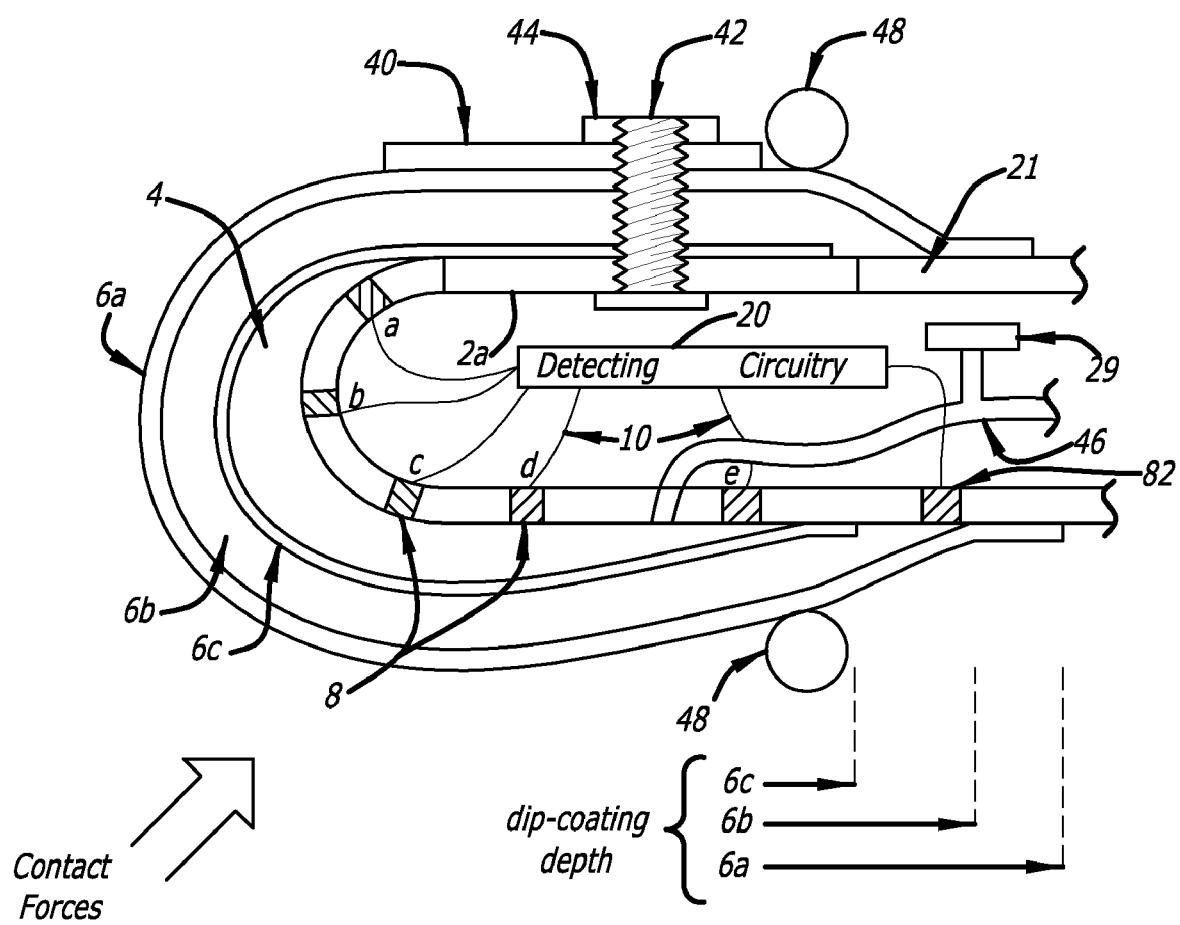
FIG. 5 shows a longitudinal cross-section of a tactile sensor in the form of a finger pad and which employs variable-capacitance sensing.

Yet another exemplary embodiment in which the deformation of the skin 6 and pulp 4 may be detected as variable capacitance as illustrated in FIGS. 5 and 6. FIG. 5 depicts a longitudinal cross-section of sensing assembly 1 in which the skin 6 may be composed of three layers: outer layer 6a may be made of a textured dielectric material suitable for cosmesis, 6b may be made of a conductive material such as a metal-filled polymer, and 6c may be a thin, inner layer made of a soft dielectric material such as some silicone elastomers. Said layers may be formed by successive dip-coating to staggered depths as illustrated, using core 2 as a mandrel. Conductive skin layer 6b may be dip-coated so as to make electrical contact with common electrode 8z, as depicted schematically in FIG. 6. Core 2 may be equipped with capillary tube 46 which is used to introduce pulp 4 under pressure to inflate skin 6 away from core 2. Optionally, fill tube 46 can be connected to pressure transducer 29, which may be useful particularly to detect small, high frequency fluctuations in pressure in pulp 4 such as might be caused by vibration arising from sliding the textured outer surface of skin 6a over textured objects. At its proximal edge, skin 6 may be retained by O-ring 48 against core 2 to prevent loss of pressurized material from pulp 4. Advantageously, core 2 may have a removable section 2a that provides access to install detection circuitry 20, leads 10 to the inner surfaces of electrodes 8 and 9, and such other components as may be desired. Optionally, removable section 2a of core 2 may be equipped with a tension member 42 by which finger nail 40 can be compressed against skin 6 by retaining member 44. This arrangement may provide improved cosmesis and contributes to the specialized sensitivity of electrodes such as electrode 8a which is near the edge of finger nail 40.

For use in the variable capacitance sensing assembly 1 illustrated in FIG. 5, detection circuitry 20 may be configured according to the electronic schematic illustrated in FIG. 6. Energization signal 22 may be an AC voltage that is applied to common electrode 8z and thus to conductive skin layer 6b. The capacitance between each sensing electrode 8a, b ... and conductive skin layer 6b may constitute the electrical impedance 24 that changes as the thickness of the dielectric pulp 4 between these elements changes in response to contact forces. A small fraction of the voltage of the energization signal 22 may be detected on each of sensing electrodes 8a, b ... by detection circuitry 20. The data from all sensing electrodes, pressure transducer, and other sensors that may be incorporated (e.g. temperature sensors) may be combined and serialized by multiplexor 28 and transmitted to analysis logic 30.

Signal Conditioning Circuit

It is also useful to minimize the number of electrical connections that must be made from the control system for the mechatronic hand to the fingertip in which the tactile sensor array is located. This can be done by multiplexing the data derived from each electrode contact into a serial stream of digital bits. The circuitry required for energizing the electrode contacts, analog signal conditioning and digitization may be located physically in the fingertip, along with the various electrodes, other transducers and their electrical connections. Normally, this might require many different active circuits or a custom-designed integrated circuit. In an exemplary embodiment a simple circuit can be built from off-the-shelf components, including integrated circuits that could be procured as bare dies and incorporated onto a hybrid circuit for direct connection to the various electrodes comprising the tactile sensor array.

As discussed above the Biomimetic Tactile Sensor (TAC) may be based on the measurement of the dynamically changing electrical impedances associated with a plurality of electrodes in contact with a weakly conductive fluid trapped between the rigid core on which the electrode contacts are mounted and a skin-like flexible enclosure. If in an alternative embodiment the electrodes are an inert metal such as gold or platinum and the fluid is a dilute solution of sodium chloride or other salt in water, then the impedance consists of a largely capacitive metal-electrolyte interface in series with the largely resistive fluid.

Deformation of the skin may change the impedance by changing the shape and, hence, resistance of the fluid path between the sensing electrode and a reference electrode. This can range from about 1 kΩ to 1 MΩ depending on the design of the sensing array and the amount and distribution of force exerted on the skin.

In order to avoid polarization, electrolysis and/or corrosion of the electrodes, it may be ideal to apply only alternating currents with no net direct current component. The impedance can be measured from the amplitude of the voltage waveform induced across the electrode by such a controlled alternating current. Useful frequencies for this AC energization may be generally in the range 5-100 kHz.

Because of the wide dynamic range of the output signals from each electrode, it may be desirable to digitize the amplitude of the voltage waveform with high resolution, typically 12-16 bits/sample. A typical sensor array may have perhaps 20-100 contacts, all of which may be sampled at a sufficiently high rate to detect temporal changes in the impedance associated with typical active exploratory movements of the fingers for haptic perception.

Figure 8:
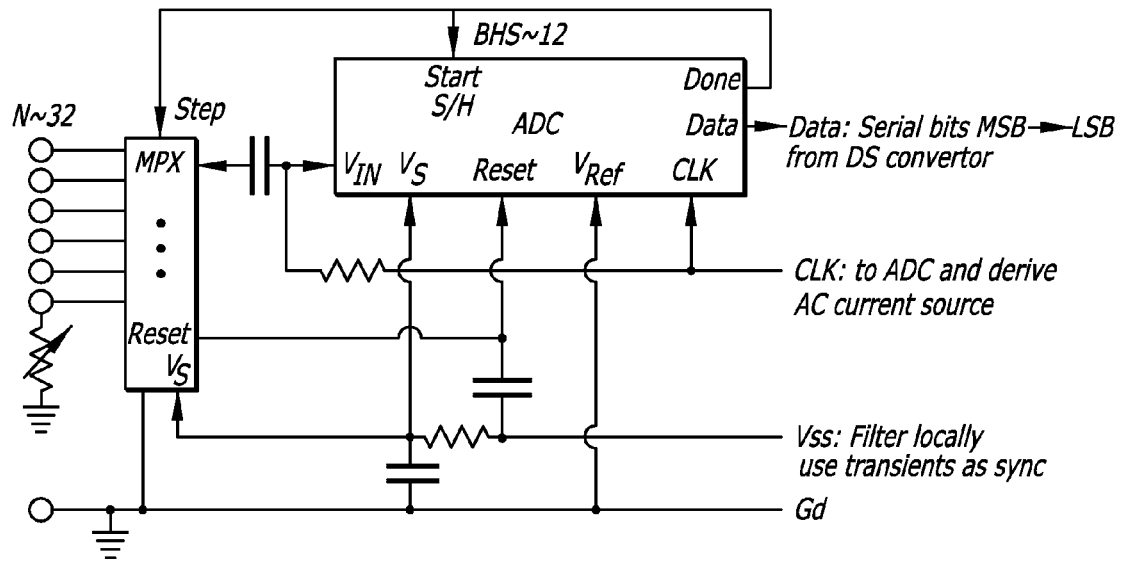
FIG. 8 shows an alternative embodiment of tactile sensor signal conditioning circuit.
Figure 8:
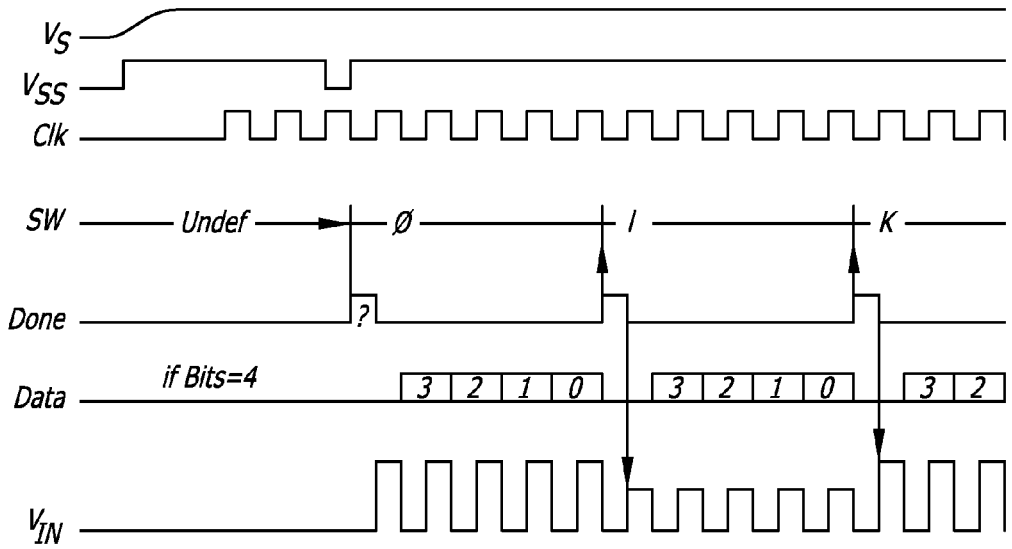

In the preferred embodiment illustrated in FIG. 8, in an alternative embodiment it has been assumed that 32 sensing electrodes are needed to be sampled with for example 12 bit accuracy at 100 frames per second which an aggregate data rate of 38,400 bits/s may be created. These values may be achievable with conventional multiplexing and digitizing circuits. Such circuits require digital clocking signals to operate. An analog-to-digital converter (ADC) that may operate by successive approximation generally requires one clock cycle for each bit of conversion, so the clock signal may have a frequency suitable for energization and measurement of the electrode contacts. Each converted bit can be transmitted immediately, creating a serial code on a single output line. The multiplexor (MPX) to switch the detection circuitry to successive electrodes may step to the next electrode when each conversion is done and the ADC may shortly thereafter sample and hold the analog value for the next conversion. Both of those operations may occur synchronously with the clock signal.

In the preferred embodiment, a single square-wave may be supplied from the external circuitry that may be is used to clock the ADC and to generate the current waveform for energizing the electrodes. By adjusting appropriately the clock edges and phases of the various transitions as indicated in FIG. 8, it is possible to perform all of the signal conditioning, sampling, digitizing, serializing and synchronizing functions using only the two active circuit functions (MPX and ADC) and four external lines (Data, Clk, Vss and Gd) as indicated in FIG. 8. In particular, Vss may be used to supply power to the active circuit functions and to provide a synchronization pulse to command the start of a frame of successive impedance measurements and serial Data transmission. Clk may consist of a square wave that can be used as a clock for the ADC operations and may be converted into an alternating current source with zero bias by the resistor and capacitor that connect it to the common pole of the MPX.

Feature Extraction

The positioning of the electrodes 8 with respect to the contours of the core 2 and overlying pulp 4 and skin 6 may cause distinct patterns of change in the various impedances 24 measured by the detection circuitry 20 as the sensor assembly 1 contacts various objects and surfaces with various force vectors. Analysis logic 30 may incorporate feature extraction algorithms to make inferences about the nature of the contact according to the patterns so detected. It may be useful to identify how different aspects of any particular stimulus parameter to be sensed will influence the array of electrodes comprising the sensor assembly 1. If such influences result in sufficiently distinct output patterns across all of the elements of the sensor, then it may be feasible to employ algorithms known as neural networks that may function similar to those embodied in the nervous system in order to identify the nature of the contact state in terms of feature of contacted objects and spatiotemporal distribution of contact forces. That is, neural networks can be trained by learning to respond in a useful manner to those features of any stimulus that must be discriminated. FIG. 7 illustrates a configuration in which the serialized sensor data from the sensor assembly 1 may be processed by analysis logic 30 consisting of an input demultiplexor 32 that provides data to the input layer of neural network 34. The output layer 36 may provide control signals 37a-c to actuators 38 that operate the articulations of the mechanical hand 39. Movements of the mechanical hand 39 may give rise to changes in the contact forces between the fingers and external objects to be gripped, which results in changing signals from the sensor assembly 1. The neural network 34 may consist of a matrix of connectivity between input and output signals embodied as gains in a hidden layer. The neural network 34 may be trained to produce the desired transformation between input and output signals by iteratively and systematically adjusting those gains according to training signal 35 derived from comparisons between the responses of the mechanical hand 39 and a dataset of observations of normal human hands manipulating similar objects under similar conditions.

The following is an exemplary list of stimulus features, their effects on the electrical impedances 24 may be measured among various electrodes 8, and associated feature extraction algorithms that can be incorporated or trained into said analysis logic 30. The examples are all described with reference to the first exemplary embodiment in which the pulp 4 may be a moderately resistive volume conductor and the skin 6 is a dielectric, but similar feature extraction algorithms can be applied to the temporospatial patterns of impedance that can be measured by the sensor assembly for the various alternate embodiments described above, as will be obvious to one normally skilled in the art. Most are illustrated with reference to FIG. 4, a cross-sectional view along axis A-A as denoted in FIG. 1, which represents only one of many such parallel cross-sections, each potentially containing a plurality of electrodes and related circuitry. The changes in electrical impedance 24 are discussed in the context of the first preferred embodiment presented in FIGS. 1-4 in which decreases in the distance between skin 6 and electrodes 8a, b, . . . may produce increases in electrical impedance 24. In other embodiments, changes in distance may give rise to different but detectable changes in electrical impedance 24, which can be related to stimulus features by variants of detection circuitry 20 and analysis logic 30 that would be obvious to one normally skilled in the art.

Contact Force

As the total force increases on central area of the sensor assembly 1, the pulp 4 may be squeezed laterally into the region near the seal 7 at the perimeter note increasing space between skin 6 and electrodes 8 at positions a and b. The pulp 4 overlying the electrodes 8 in the compressed central area of the sensor assembly 1 becomes thinner, causing the impedance measurements associated with those electrodes to become higher note decreased space between skin 6 and electrodes 8 at positions d, e and f. The sum of all such impedance increases is related to the total force of contact; that sum will be dominated by the nonlinear increase in impedance as electrodes approach the skin.

Centroid and Area of Force

The impedance increases associated with the contact force measurement above can be related to the position of the electrodes 8 in the array in order to estimate where the center of force is located on the surface of the sensor assembly and the radius of curvature of the contacting object. For example, a sharp object might produce a local deformation of the skin that would cause large changes of impedance for only one or a few electrodes close to the point of contact. If the pulp 4 is an incompressible material, any decrease in its thickness over one or more electrodes 8 may be accompanied by a bulging increase in its thickness over other electrodes 8 at a distance from the region of contact.

Eccentricity of Force

If the contacting object is not radially symmetrical, the distribution of impedance changes detected by the electrodes will be similarly asymmetrical. This asymmetry can be detected to make inferences about the shape of the contacting object.

Shape of External Object

If the contacting object is not radially symmetrical, the distribution of impedance changes detected by the electrodes will be similarly asymmetrical. The spatial pattern will also be related to the radius of curvature of the contacting object. For example, a small or narrow object will produce a local deformation of the skin that will cause large changes of impedance for only one or a few electrodes close to the point of contact. A sharp edge will cause an abrupt boundary between electrodes with high impedance and those with low impedance (as a result of displacement of fluid and bulging of the skin).

Vector of Force

In most object-manipulation tasks, the force between the sensor assembly 1 and the contacted object may not be oriented normal to the surface of the sensor assembly 1. In biological skin, shear force components change the stress and strain distributions within the fingertip that are sensed by receptors located within dermal and subdermal tissues but also by the distribution of pressure around the perimeter of the finger pad, particularly where the skin is anchored by the nail bed. This is described in the above-referenced and incorporated journal article (Birznieks, Jenmalm, Goodwin & Johansson 2001). In our tactile sensing finger tip, those electrodes located on the most convex portions of the core near the seals of the skin will detect large increases in impedance when shear forces are directed away from them. Such force will cause the skin to slide, compressing the fluid over these electrodes. A deviation of the force vector from normal is generally associated with a tendency of the grasped object to slip or rotate [17, 18].

In an exemplary embodiment, those electrodes 8 located on the most convex portions of the core 2 near the seals 7 of the skin 6 may detect large increases in impedance when shear forces are directed away from them (see electrodes at positions h and i in FIG. 4). Such force may cause the skin 6 to slide, compressing the pulp 4 over these electrodes. A deviation of the force vector from normal may generally be associated with a tendency of the grasped object to slip or rotate unless that deviation met by increased normal forces or is opposed by the net deviations at other points of contact with the object, as described in the above-referenced journal articles (Flanagan, Burstedt & Johansson 1999; Johansson & Westling 1984).

Vernier Detection of Force Shifts

The detection of imminent slip is essential to the maintenance of efficient and effective grip on objects, in which it may be generally desirable to produce only the minimal force on the object required to initiate and maintain stable grasp. In the biological fingertip, imminent slip is detected by localized, tiny shifts in the distribution of shear forces in the skin. The relationship between electrode impedance and thickness of the overlying pulp may be inherently highly nonlinear, as described above. For example, if the inner surface of the nonconductive, elastomeric skin actually touches and covers an electrode, its impedance with respect to any other contact may increase abruptly towards infinity. By incorporating protruding textural elements 5 such as bumps and ridges onto the inner surface of an elastomeric skin 6, the distribution of impedances across the array of electrodes may undergo large changes when the skin is compressed against the core. In FIG. 4, the impedance 24 of the electrode 8 at position e would be highest because one textural element 5 is sized and positioned so as to completely cover it, while somewhat lower but nearly equal impedances would be measured for electrodes at positions d and f, which are incompletely covered by adjacent textural elements 5. Even a small lateral shift or stretch of skin 6 would reposition the three textural elements 5 with respect to all three electrodes, producing a large and readily detectable change in the pattern of impedances measured. In an exemplary embodiment, the system may be configured to detect the onset of any change in the shear force distribution, rather than the actual shear forces or the direction of the change. The appropriate response to the imminent slip implied by any such change is an increase in the grip force applied to the object as described in the above-referenced journal article (Johansson & Westling 1987).

Contact Transients and Vibration

Biological skin contains specialized Pacinian receptors that are highly sensitive to the acceleration component of skin deformation, making them useful to detect transient mechanical events that occur when making and breaking contact between a held object such as a tool and another object, and vibration of skin induced by the motion of skin ridges sliding over a textured object surface. The impedance of the electrodes in embodiments of the present system may undergo only very small changes when lightly loaded, but it may be possible to detect such changes by means of their synchronous phasing across the entire array of electrodes. Various signal averaging techniques to enhance the detection of the correlated component of weak and noisy signals from an array of sensors are well known in the prior art. Alternatively as depicted in FIGS. 5 and 6, the hydrostatic pressure in pulp 4 can be monitored by a conventional pressure transducer 29 connected to fill tube 46. The detection of transient mechanical events may be a key component in the automatic control of most object manipulations, which are organized around sequentially linked action phases delimited by discrete contact events that represent attainment of task subgoals. This is described in the above-referenced journal article (Westling & Johansson 1987). One commonly used signal processing technique to enhance the detection and timing of transient events in electrical signals may be the computation of temporal derivatives, which can be performed by analog circuits and digital signal processing algorithms that are well-known to electrical engineers. It is within the scope of our system to apply such techniques to the signals obtainable from the sensors described herein in order to enhance the utility of the tactile information so derived. Examples of the extraction and use of temporal cues by biological tactile systems can be found in the above-referenced journal article (Johansson & Birznieks 2004).

Object Hardness/Softness

Figure 15:
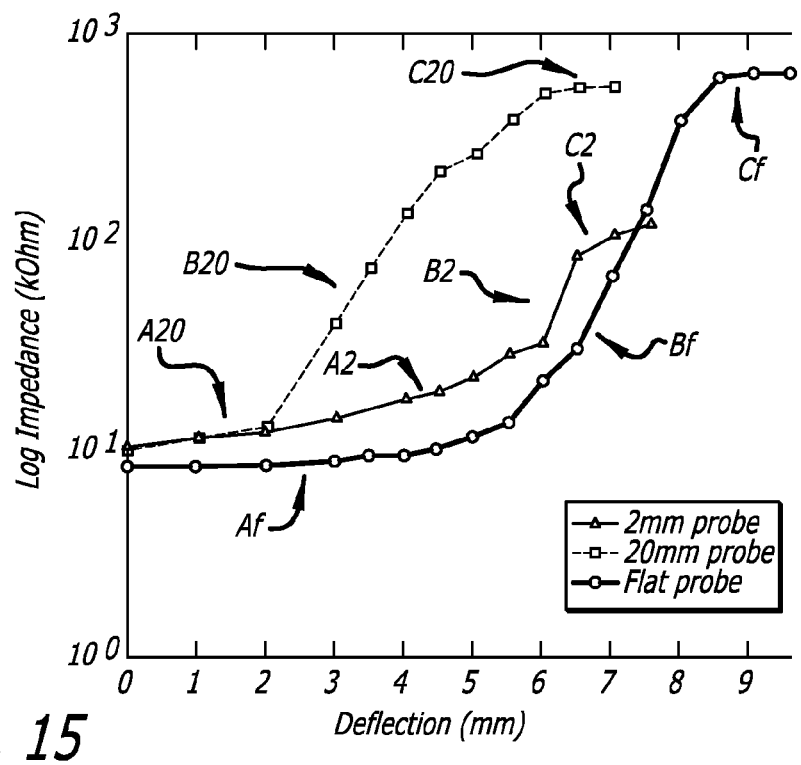
FIG. 15 shows Log impedance (1-1000 k$\Omega$) versus static deflection of skin applied by three probes with different curvatures. Three distinct operating regions (labeled A, B and C) are present for each curve and discussed in text.

As noted in FIG. 15, the sensor responds dramatically to light deformation. As previously stated, the sensor can detect mechanical transients associated with making contact with an object. If the sensor is affixed to a mechatronic finger moving at a known velocity, the rate of deformation increase can be used to indicate the level of hardness or softness of a contacted object. A hard object may cause a rapid increase in deformation (and voltage response) for a given finger velocity when compared to a soft object.

Further Feature Characterization

The basic characterization of the sensor with respect to force, deflection and impedance has been disclosed.

Some information (particularly about position such as force centroids and areas) could be extracted analytically, based on a reasonable mathematical model. Our sensor array has properties similar to the biological fingertip, however, so it may likely require non-analytical signal processing methods similar to those employed by the biological nervous system. The temporospatial distribution of activity in the biological touch sensors depends complexly on the inherent sensitivity of the sensors, their distributions throughout the tissues of the fingertip and the forces that the fingers apply to external object, as well as on the nature of the external object itself. Similarly, in our array of tactile sensors, force magnitude and location interact with each other. For example, the same force vector applied close to the nail bed may create a different amount of net impedance change than if applied to the fingertip; the total change in impedance may not be used as a measure of the applied force unless corrected for the position. At higher force levels the information about position may be blurred because of nonlinear changes in electrode impedance as the inside surface of the skin makes contact with the electrodes. This is similar to the saturation of light touch receptors and the need to incorporate information from deep touch and nociceptors in biological skin.

The characterization experiments described above may produce a rich data set consisting of pairs of input vectors (describing location and components of applied force) and output vectors (voltages related to impedances of the electrode array). These may be used to train neural networks for various tasks. This approach can be used to determine the discriminability of various input conditions or, conversely, to determine the ability to generalize a single parameter such as magnitude of forces applied to different portions of the finger tip. For the force intensity extraction, a multi-layer perceptron (MLP) and radial-basis neural network may be used initially because both have proven to be able to approximate any given non-linear relation when a sufficient number of neurons are provided in the hidden layer [21, 22]. For the mapping of force localization on the finger surface, a Kohonen network would also be feasible [23]. Two-point discrimination may likely be possible but may depend critically on the thickness and viscoelastic properties of the skin.

Enhancements

In addition to the primary array of electrodes and electrolyte, this system is capable of being easily fitted with enhancements and auxiliary systems to provide further sensory information.

To enhance vibration sensing, dermal ridges (i.e. fingerprints) can be molded onto the exterior of the elastomer. Human ridges are typically 0.1 mm in height and 0.3-0.5 mm in width and aid in sensing of rough surfaces [24]. Mukaibo et al. showed successful application of this principle in their tactile sensor that included a solid distal phalanx coated in a silicone elastomer [25]. They convert texture into vibration during the stick-slip phenomena as the ridges are run over an object's surface, which is detected by the Meissner corpuscles below the epidermal ridges. The frequency of the vibration is:

$$f = v/\lambda \quad (1)$$

where f is frequency; v is finger velocity and λ is peak-to-peak distance between ridges. Such small amplitude vibrations may produce coherent signals in the various contact impedances but their amplitudes could be small and may be difficult to detect. Alternatively the pressure in the fluid as a whole could be sensed by incorporating a hydraulic pressure sensor on the end of the fill-tube, doubly acting as its plug. A commercial sensor such as Silicon Microstructures' SM 5822 is ideal for this purpose.

Thermal sensing may also be desirable as a part of haptics and could be incorporated in several ways. Saline solutions tend to increase their volume conductivity at higher temperatures (the reverse of solid-state resistors) so it may be necessary to incorporate a thermistor on the surface of the core to adjust the calibration of the impedance sensing. Alternatively, the resting distribution of electrode impedances will reflect ambient temperature. Conventional thermistors mounted on the core will tend to respond slowly to contact with hot or cold objects because the heat capacity of the surrounding fluid and skin will reduce their sensitivity to external objects. It may be necessary to mount a thermistor on the skin itself, a problem that must be solved for any gripping surface that includes a viscoelastic pad to help stabilize contact with objects. For haptic characterization of the material properties of objects, humans actually use heat flow from body temperature, so a heated thermistor may be necessary.

Tactile Sensor for Control of Grip

Figure 9:
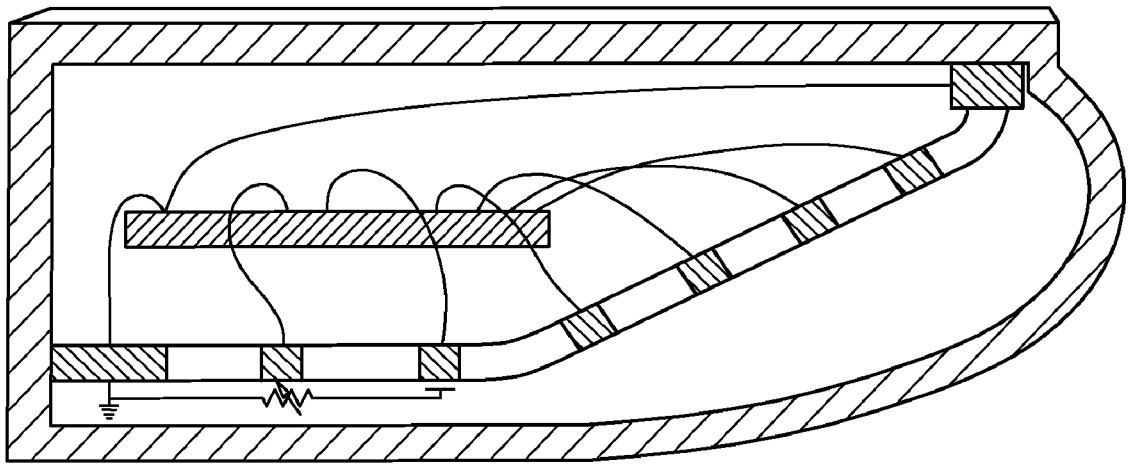
FIG. 9 shows an alternative mechanical drawing of the tactile sensor.
Figure 10:
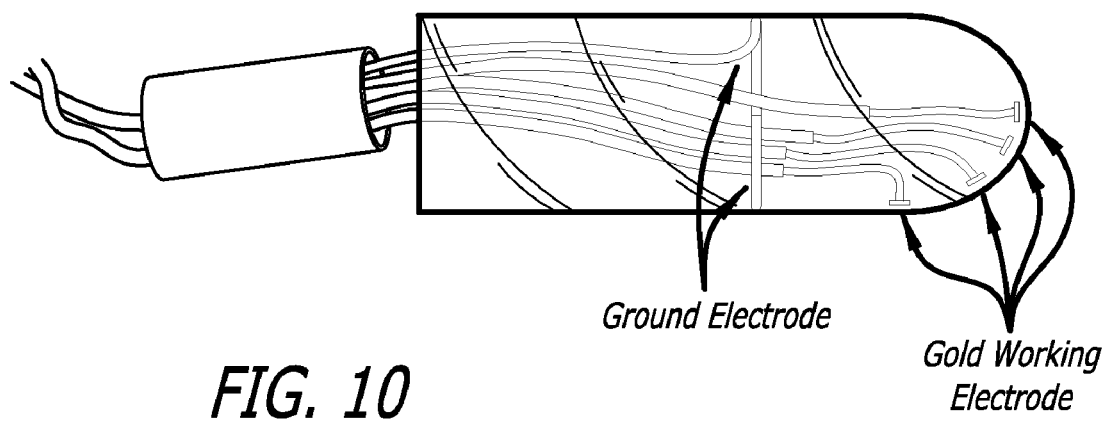
FIG. 10. shows an alternative embodiment of a tactile sensor core with the skin removed.

FIG. 9 depicts a tactile sensor that is shaped like the fingertip and consists of a rigid central core surrounded by fluid and covered by a silicone elastomeric "skin". The skin is resistant to wear and possesses texture and tackiness similar to the properties that facilitate grip by biological fingertips. External forces deform the skin and weakly conductive fluid, causing changes in the electrical resistances measured by an array of electrode contacts distributed over the curved surfaces of the core. The impedance of each volume conductive path can be measured by applying an alternating current to each contact and measuring the resulting voltage drop with respect to a reference contact. FIG. 10 depicts an image of a sensor core with the skin removed.

i) Prototype Fabrication and Theory of Transduction

The initial prototype contained four gold working electrodes and a wrap-around copper ground electrode. The gold electrodes were the cross-sectional area of wire with a diameter of 0.635 mm, whereas the copper electrode is a wire with a diameter of 0.406 mm. The wires were anchored in the walls of a machined acrylic body (13 mm diameter, hemispherical end) that was subsequently filled with epoxy.

Figure 11:
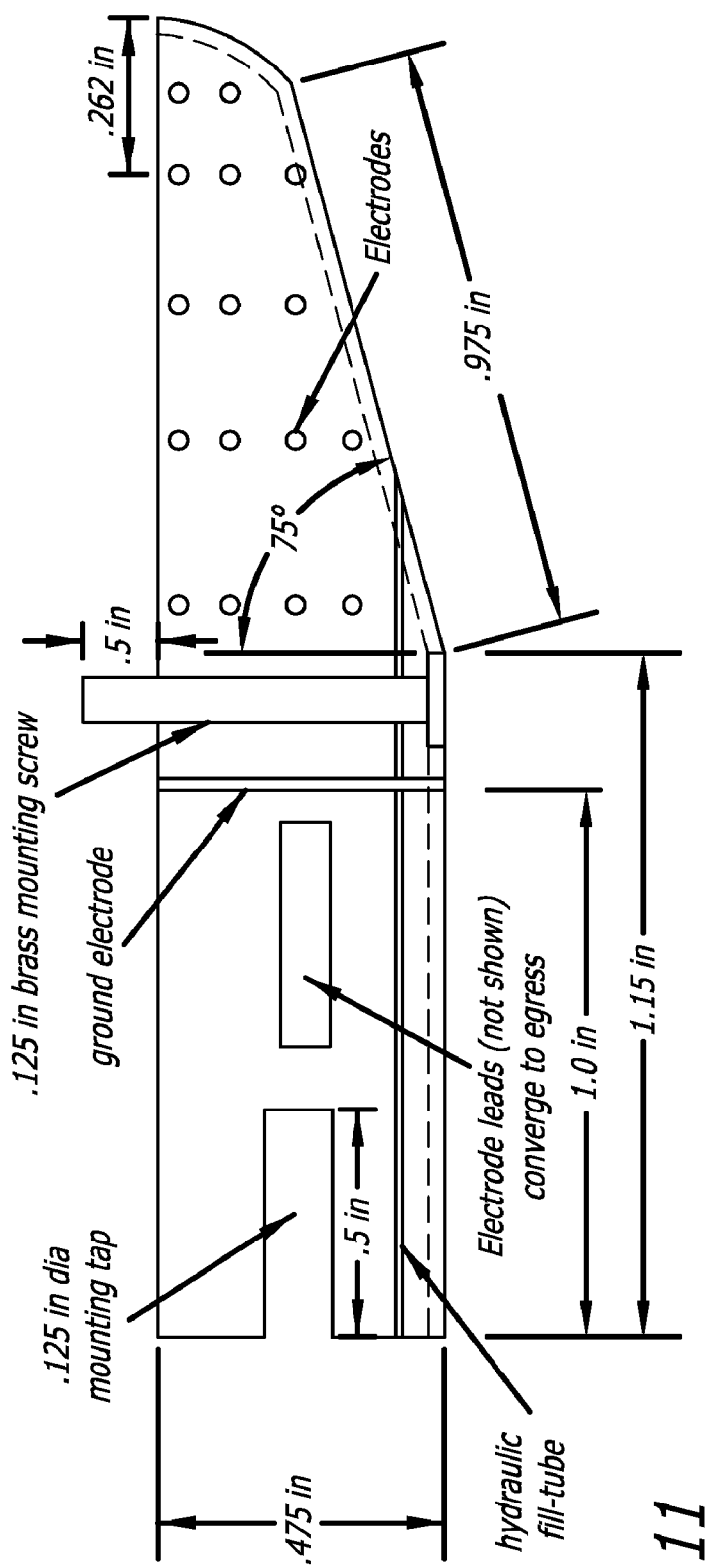
FIG. 11. shows an alternative embodiment of the mechanical configuration of the tactile sensor.

To build the next prototype (FIG. 11), we machined a jeweler's wax mold whose shape is similar to the distal phalanx. Individual gold contacts were formed by melting the end of a 0.25 mm gold wire with 5μ Parylene-C insulation into a ball and swaging to the desired diameter and contour. The contacts were tacked to the inside of the mold where desired and the wire lead was soldered to a multipin electrical connector. A capillary tube was affixed in the mold for later use to inflate the fingertip with fluid. The mold was filled with liquid dental acrylic and cured to form a rigid finger core with electrodes on its surface. Thus there are no moving parts and the sensing components and wiring are protected in a high-strength rigid core (compressive strengths 10-100 MPa and tensile strength 1-10 MPa [11]).

Texturing of the internal surface of the skin (see below) can be created by abrading the surface of the rigid core if desired, followed by a mold-release coating. The fill-tube is loaded with fluid by capillary action and the fingertip is dip-coated in silicone to achieve the desired thickness of polymerized skin. A cap is screwed into the top of the core to act as the fingernail, anchoring the skin to the core on the dorsal side of the fingertip. The fill-tube is used to inflate the skin away from the core with the desired fluid. Mechanical fixation features can be incorporated into the mold to facilitate mounting of the fingertip to the mechatronic hand or to mechanical test instrumentation.

The sensitivity of the device depends complexly on the size of the electrode contacts, the conductivity of the fluid, and the viscoelastic properties of the combined system of skin and pressurized fluid. Lower viscosity may provide higher sensitivity and frequency response. Lower conductivity may provide higher sensitivity because the electrode impedance consists of two components in series: the metal-electrolyte interface, which is essentially a constant capacitance, and the volume-conductance of the surrounding fluid and space, which act as the variable resistance to be measured The fluid may be a blend of glycol, water, sodium chloride and ethyl alcohol. Salt water can act as a conductor, glycol is a hygroscopic agent to preclude water loss by diffusion through the silicone elastomer and ethyl alcohol lowers the viscosity.

The choice of silicone elastomer for the skin depends on achieving mechanical properties and cosmetic appearance similar to normal skin. Candidate outer materials include Dragon Skin-Q by Smooth-On Inc. (Shore A hardness=10 and tear strength=102 lbs per inch) and VST-30 by Factor II Inc. (Shore A hardness=23 and tear strength=100 lbs per inch). A higher durometer inner coating can be used to optimize mechanical properties, while the softer, outer coatings will provide a more cosmetic appearance and feel.

Adjusting the thickness and viscoelasticity of the covering skin and contouring its inside surface may have complex effects on the dynamic range and two-point discrimination of the array. Attaching the skin to the dorsum in the manner of a fingernail and positioning sensor electrodes on the curved surface of the core adjacent to this restriction may cause these lateral-facing electrodes to respond selectively to tangential forces applied at the fingertip. Such forces may cause sliding of the skin over the core, constricting the fluid on one side of this "nail bed" and bulging it on the other, similar to a biological fingertip. The number and distribution of electrodes required to sample these phenomena efficiently remain to be determined.

The strategy of dip-coating elastomeric skin onto the rigid core may offer the advantage of easy repair of the most vulnerable part of any finger. It should be possible to replace the skin without affecting the sensing electrodes or their supporting electronic circuitry within the rigid core.

ii) Signal Conditioning

Figure 12:
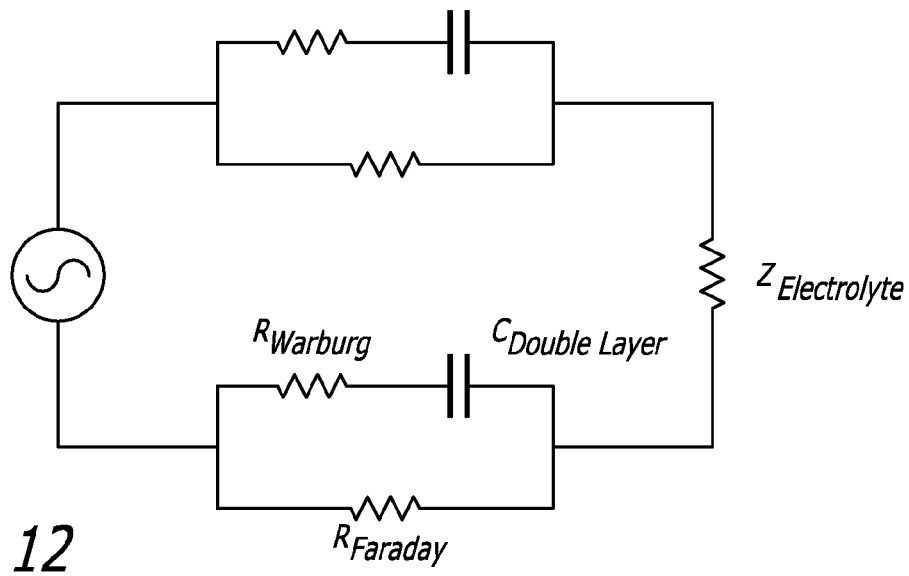
FIG. 12 shows a generic model of a working electrode, electrolyte and counter-electrode.

The electrical impedance between a single working electrode contact and a large reference electrode can be modeled by the circuit of FIG. 12.

It is desirable to energize the electrode system in such a way that the voltages developed across the double-layer capacitances are sufficiently low so as to avoid Faradaic current flow [12]. Faradaic current through metal-electrolyte junctions may tend to produce corrosion of the metal contacts and electrolysis of the electrolyte. By applying low alternating currents at reasonably high frequencies, the peak voltage across the double-layer capacitors can be kept low and the Faradaic resistors can be ignored. This leaves the double layer capacitance of both electrodes and the resistance of the electrolyte in series. The capacitance per unit area of our electrodes lies between 10 and 100 μF/cm2 [13, 14]. For a single electrode contact 1 mm in diameter; the impedance at 5 kHz will be on the order of 100Ω. This is negligible compared to the dynamic range of the sensor's resistivity (10-800 kΩ in the prototypes described below). The impedance for the counter-electrode may be even smaller because it is larger and possesses an even greater capacitance.

Figure 13:
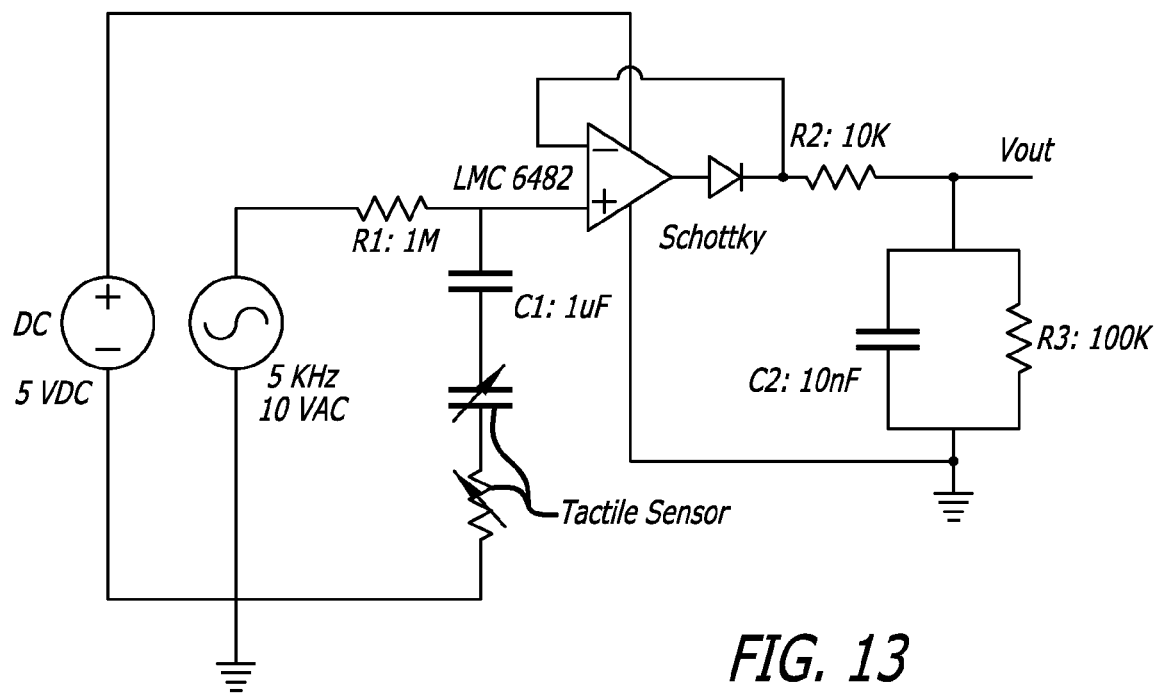
FIG. 13 shows a circuit diagram of a single sensor channel.

The detection circuit of FIG. 13 is driven with a 5 kHz 10VAC sine wave in series with R1, which acts as a current source over the lower impedance range of the sensor. Based on the dynamic range of sensor impedances measured, a 1 MΩ resistor was chosen for R1. The envelope magnitude of the sinusoidal signal is demodulated by the active rectifier (op amp LMC 6482) to provide Vout. C1 is a blocking capacitor that removes any DC bias from the sensor electrodes to prevent corrosion and electrolysis. The time constant of the filter R2C2 was chosen to be 0.1 ms. This is based on physiological experiments that showed that the loading phase of a grip may never be shorter than about 200 ms [15]. The resistor R3 serves to discharge the capacitor C2 when the diode is not conducting. In an array of such electrodes, most of the circuitry can be electronically multiplexed among rather than duplicated for each electrode.

iii) Probe Experiments

Figure 14:
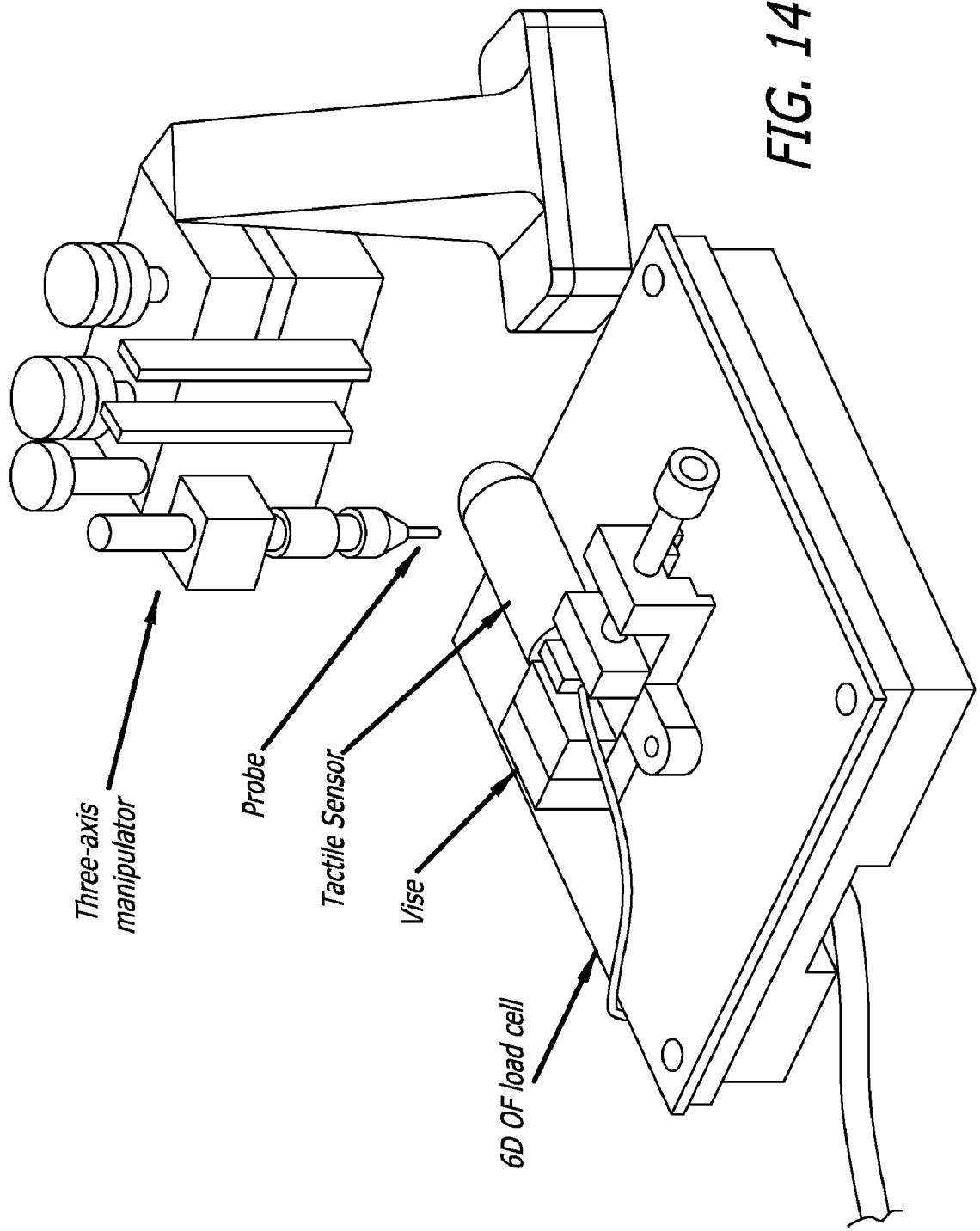
FIG. 14 shows a testing set-up including a force meter, manipulator and a tactile sensor.

To determine static characterization of a single electrode, normal forces were applied to the array at a calibrated distance from the electrode of interest. A three-axis manipulator was used to advance interchangeable probes: 2 mm diameter with 1 mm radius of curvature, 20 mm diameter with 11.5 mm radius of curvature, and a large flat plate (9.67 cm2). The probes were chosen to have radii of curvature much small than, approximately equal to and much larger than the curvature of the tactile array, respectively. Deflection was recorded from point of first contact with the skin. Vertical force was measured by an AMTI HE6X6 six-axis forceplate under the clamp for the fingertip (FIG. 14).

The data are reported here as the actual electrode impedance for the design which represents the output of the signal conditioning circuitry illustrated in FIG. 12. The skin of this sensor was a triple dip-coat of VST-30 silicone elastomer with internal texturing consisting of a thin layer of commercial latex with an array of 0.8 mm high pyramidal bumps spaced approximately 2 mm apart. The sensor was inflated with 3.5 mL of a dilute NaCl solution (0.75 g/l; 1/12th the concentration of physiological saline).

Results

Single Electrode Static Characterization

1) Deflection Applied Directly Above Electrode

As the fingertip is compressed, there is a monotonic but nonlinear increase in electrode impedance over a range of 10-100 times the starting value (FIG. 15). The slopes depend complexly on the curvature of the probe, as discussed below. The reaction force of the fingertip also rises monotonically and nonlinearly as the fluid is displaced from under the skin (regions labeled A in FIGS. 15 & 16) and then the skin is compressed against the rigid core (regions B and C). This results in the impedance vs. force curves illustrated in FIG. 16 for the same trials as FIG. 15. Interestingly, the sigmoidal shape of these logarithmic curves is reminiscent of many biological transducers, which generally need to optimize local sensitivity over a wide dynamic range of possible inputs.

2) Deflection Applied Above and Around Electrode

Figure 17:
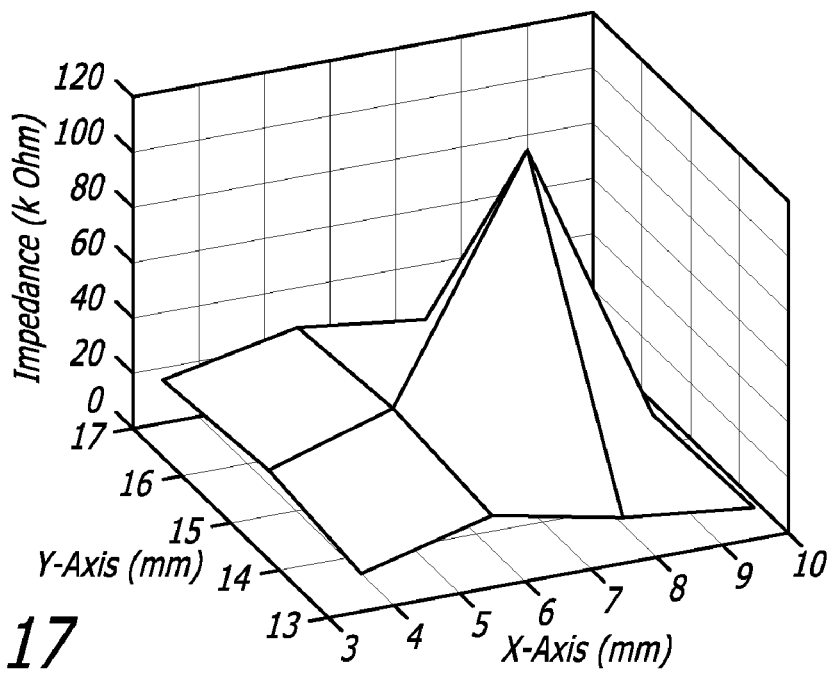
FIG. 17 shows Impedance as a function of center of pressure with respect to the electrode location.

The sensor was systematically probed in a 3 by 4 grid at 2 mm increments to a skin deflection of 5.5 mm using the 2 mm probe. This was done about an electrode located at X=7.5 and Y=15 mm to show sensitivity to nearby deformations (FIG. 17).

3) Two-Electrode Response to Rolling Motion

As a crude test of the distribution of responses across multiple electrodes, the prototype sensor was rolled over an Inastomer force sensitive resistor while observing the rectified and filtered signals from multiple electrodes on an oscilloscope.

Figure 16:
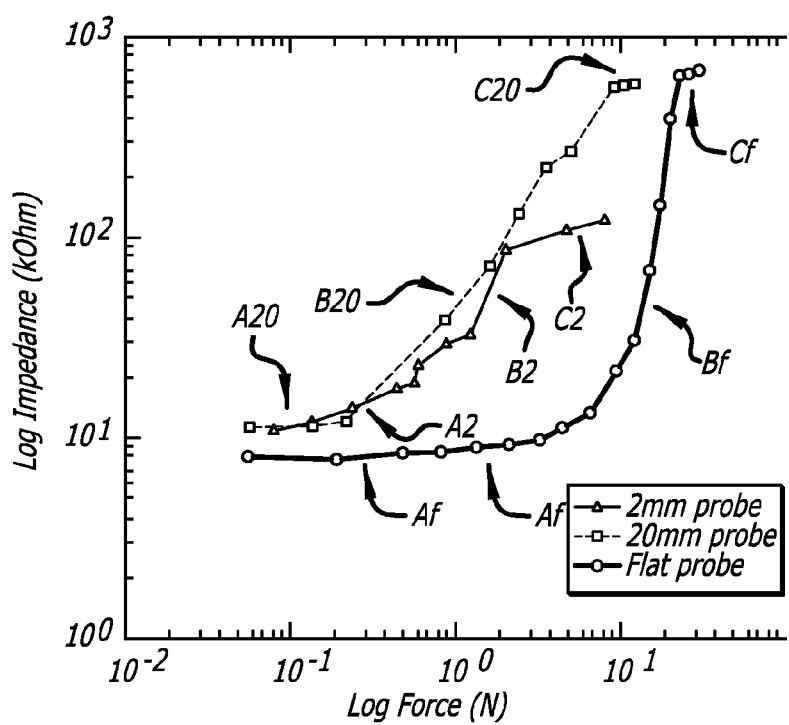
FIG. 16 shows Log Impedance versus log force (0.01-100N) normal to skin surface for same deflections as in FIG. 15.

As illustrated in FIGS. 15 and 16, the response of the sensor varies significantly with radius of curvature and contact surface area of the incipient object, but generally consists of three phases. During the initial deflection of the skin, the fluid is displaced from between the skin and the core but the shape of the remaining conductive path depends on the shape of the probe. For the 20 mm probe (similar in curvature to the core), there is a gradual rise of impedance and force (region A20) for the first 2 mm of deflection until the skin contacts the electrode. Then the impedance and the force rise rapidly (region B20) as the textured inner-surface of the skin starts to seal to the electrode (plateau at region C20). For the 2 mm probe, the gradually rising portion is longer (A2) because the small probe deforms the inner contour of the skin, preventing even contact over the entire electrode surface until it reaches a larger deflection (B2). Even then there is a residual film of fluid preventing saturation (C2) as the skin is further deformed by the small probe. In the case of the flat probe, we do not see the rapid increase in impedance until ~4.5 mm because the flat surface is causing global deformation of the sensor body (Af). Not only is the probe pushing the fluid downward, but it is also pushing it outward, causing a change in the shape, but little change in impedance of the volumetric flow-path. Eventually the skin contacts the core, producing a steeper increase in both impedance and force (Bf) and eventual saturation (Cf). The force at which the sensor saturates depends on the texture and hardness of the inner surface of the skin and the force per unit contact area that deforms this texture.

It would appear that there is an ambiguity between impedance and deflection (or force) and the shape of the contacting object. If the shape of the object is not known a priori, how is one to determine deflection or force from impedance? This problem is solved by actively exploring the object with the sensor to obtain other features such as object shape—which is exactly what the human haptic system does. The amount and timing of the deflection is caused by and known to the operator exploring the object. Thus the shape can be extracted from the time course of the impedance measured; probably by comparing the responses with the expectation based on a priori knowledge and hypothesis (see also Object Hardness/Softness below).

We also observe impedance changes when deformations occur around the electrode, demonstrating the ability to sense deformations outside the electrode's immediate vicinity. This is consistent with the hypothesis regarding the flat probe behavior previously described. FIG. 17 shows that the highest impedance value was measured when the probe deflected the skin directly above the electrode of interest.

Figure 18:
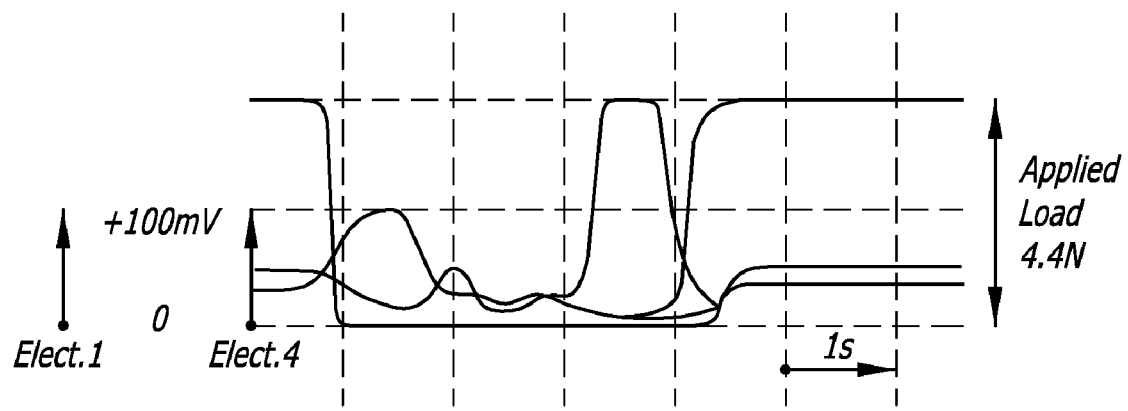
FIG. 18 shows an image of Two-electrode Sensor Output During Roll of an oscilloscope.
Figure 19:
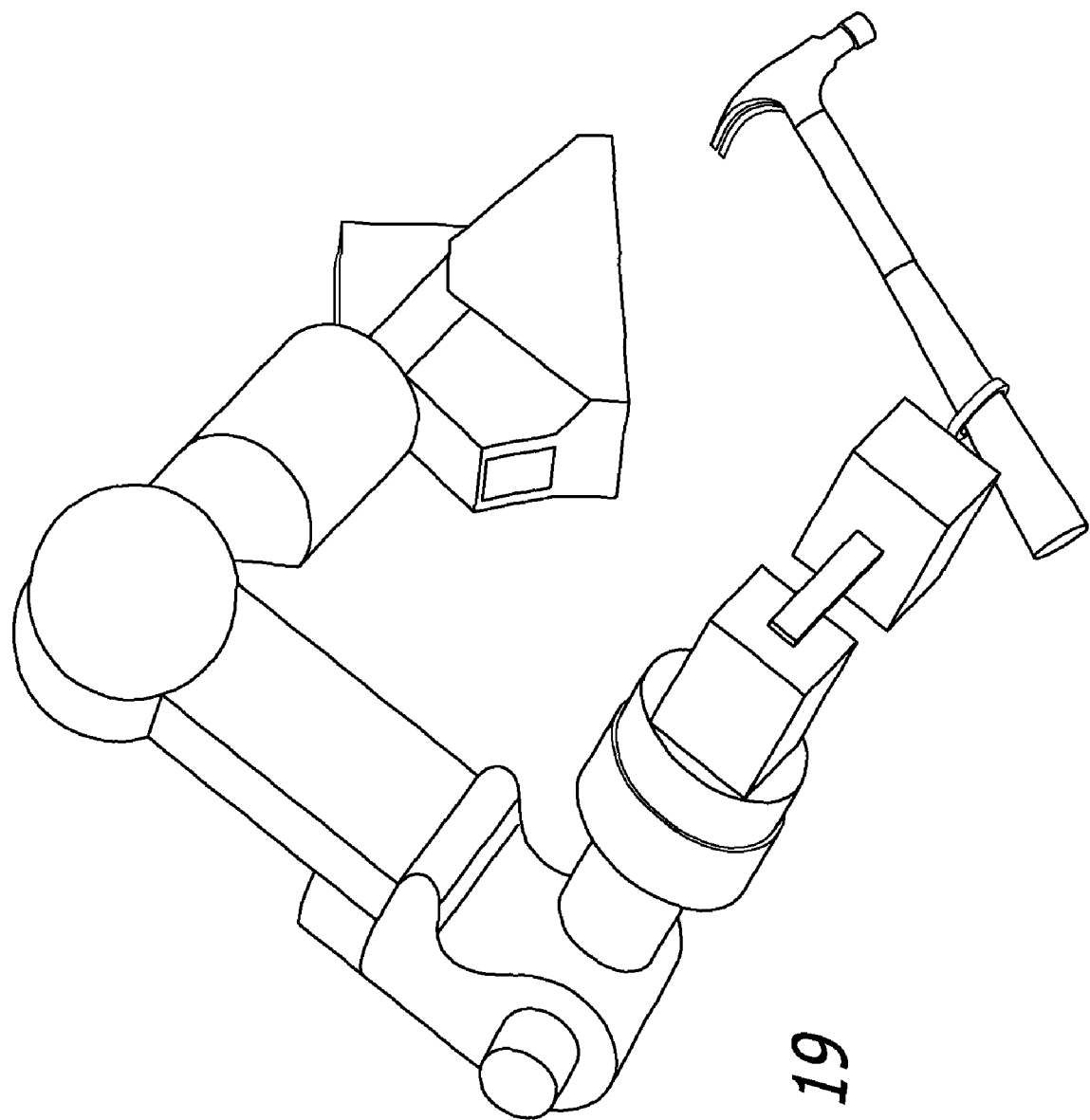
FIG. 19 shows an image of a Sarcos Robotic Arm performing the object manipulation task for which rapid, closed-loop adjustment of grip forces is likely to prove useful.

The ability to resolve information about place and motion of center of displacement is possible when observing deformations about two electrodes simultaneously. As shown in FIG. 18, the rolling motion caused global deformations that were observable at both electrodes. This is not unlike the behavior of the human finger pad when a human uses a precision grip to lift a small object. One part of the finger pad is squeezed towards the distal phalanx and the other bulges. Our sensor is able to represent such phenomena and encode features like these into a spatial pattern of electrical signals related to two-point discrimination as described in human subjects. This suggests (but does not yet demonstrate) that the tactile array will be capable of two-point discrimination with a resolution comparable to the thickness of the skin itself.

Use of the Tactile Information

Stabilizing a grip may be an function whose requirements and natural strategies are starting to be well understood. In a series of papers by Roland Johansson and coworkers, it has been shown that the grip stability may be affected by an object's size and shape, its mass and weight distribution, and by the coefficient of friction between the fingertips and surface of the object [26-28]. They have also shown that the central nervous system usually may adjust the grip force so that the friction force developed between the fingertips and the object surface may have a small margin over the external forces that would otherwise cause the object to slip [15, 29]. This strategy may be energetically be efficient and suitable for manipulating delicate objects that might be crushed, but it demands continuous tactile sensing and adjustment of grip forces according to the perceived properties of the gripped object.

Each finger's grip force may be adjusted independently based on the sensory information from that finger only and on the local conditions in terms of weight distribution and friction. At least some of this adjustment may occur so rapidly that it appears to be mediated reflexively in the spinal cord rather than via the brain. This is important for prosthetic limbs because it suggests that tactile information can serve a useful function even if communication channels to provide conscious perception of touch to the operator remain nonexistent or primitive, as they are now. Algorithms for the automatic adjustment of grip using biomimetic strategies are likely to be valuable also in telerobotic and purely robotic manipulanda.

An Internally Textured Artificial Skin

It has been disclosed in the relating application U.S. Ser. No. 11/692,718 the fabrication of the tactile sensor array by creating a rigid core with electrodes distributed on its surface which is then dip-coated with a skin-like dielectric polymer and inflated with a weakly conductive solution. It was also described that in one situation it is desirable to have the inside surface of the skin patterned with "bumps and/or ridges".

The texture of the inner surface of the skin may be an important element in controlling the relationship between sensor output and applied force or displacement. If both the core and the skin are smooth, there may be a tendency for the measured electrical impedance of the sensing electrode to rise abruptly and to saturate when the skin is pressed against it, forming a tight seal. By controlling the hardness of the material used to form the innermost layer of the skin and controlling the size and distribution of surface textural features, we can greatly extend the useful dynamic range of sensing. The texture may tend to leave channels of conductive fluid on the electrode surface, which channels may be gradually compressed and narrowed with increasing compressive force applied to the skin. Thus the output signal may continue to vary monotonically and measurably at higher forces. Furthermore, the details of this relationship may depend also on the radius of curvature of the contacting object that is applying this force to the skin and on the mechanical properties of the skin as a whole. Small objects impinging on the skin may create a distributed set of normal and transverse compressive and tensile stresses as the skin is distorted. This pattern may be different for large objects even at the same level of contact force. By careful design of the skin material properties and both internal and external texture features, the ability of the sensor array to discriminate shape, hardness and other features of external objects can be optimized.

It is advantageous to create the texture in the dip-coated skin itself to take advantage of the simplicity of this manufacturing process. The present Applicants have identified and have conducted initial experiments on the following approaches:

1) A relatively fine and generally random pattern of texture can be created by abrading the surface of the core before dip-coating with the first skin layer. This can be done by sandpaper, sand-blasting, filing, or other methods that would be obvious to one normally skilled in the art. The dip-coated skin forms a negative of the surface of the core. When inflated by the conductive fluid, the skin pulls away from the core and may unlikely to mate exactly back to the texture pattern when pressed back in place against an object. It may be useful to coat the roughened core with a mold-release agent before dip-coating to avoid difficulty inflating the fingertip as a result of excessive mechanical adhesion between the skin and core.

2) A coarser but still generally random pattern of texture can be created coating the surface of the core with a textured, water-soluble material. For example, the untextured core can be coated with a solution of poly-vinyl alcohol (PVA) with the desired molecular weight and viscosity to form a tacky layer with the desired thickness. Particles of a solid, water soluble material such as sugar can be mixed into and/or sprayed or otherwise distributed on the PVA layer to create a surface with the desired roughness, including regional differences or gradients of roughness as desired. The coated core may then be dip-coated with the skin-like polymer. When the aqueous conductive fluid is injected under the skin, the PVA and sugar may dissolve, and may leave a rough and/or spongy texture on the inner surface of the skin. Note that this method can be extended to non-aqueous solutions; the only requirement is that the material used to create the texture be soluble in the liquid used to fill the fingertip.

3) A coarse but systematic pattern of protruding elements can be fabricated by photolithographically forming the negative of this pattern on the surface of the core before dip-coating. The material forming this pattern could be a photoresist that is soluble in the liquid used to fill the fingertip but not by the uncured polymer used for dip-coating. The photoresist could be dip-coated onto the smooth core and patterned by exposure to light such as from a steerable laser beam. Various methods have been developed in the industry for photolithographic patterning of curved surfaces. Forming patterns optically on the surface of the core may have the added advantage of facilitating precise registration between the protruding elements of the skin and the spatial distribution of sensing electrodes, which is likely to be important for the "vernier-like" mode of sensing described in the related pending patent.

Other Aspects of Manufacture

We are now using a method of fabrication for the core in which we create a negative mold of the desired core shape, advantageously using a relatively soft material such as machinist's wax. Components that need to be present on the surface of the mold (such as the electrode contacts and the capillary fill tube opening) can be affixed in the desired locations by pressing them onto the surface of the mold. Electrode contacts can be formed on the ends of insulated wires such as gold or platinum by melting a ball on the end of the wire and swaging the ball to the desired shape and contour, a method we developed originally for use in the fabrication of cochlear electrodes (Loeb, G. E., Byers, C. L., Rebscher, S. J., Casey, D. E., Fong, M. M., Schindler, R. A., Gray, R. F. and Merzenich, M. M. Design and fabrication of an experimental cochlear prosthesis. Med. & Biol. Engng. & Comput. 21:241-254, 1983; Loeb, G. E., Peck, R. A. and Smith, D. W. Microminiature molding techniques for cochlear electrode arrays.
J. Neurosci. Meth. 63:85:92, 1995). Any desired mechanical or electrical connections from those components can be made to electronic circuits or connector pins in the open mold. All of the components and their interconnections are then embedded in the core material that is poured into the mold around the components and cured in place. At present, we are using dental acrylic to form the core. This method lends itself well to resealing the tactile array for different applications, changing the curvature of its surface, and/or changing the number and distribution of electrode contacts.

As described above, it may be advantageous and feasible to incorporate most or all of the signal conditioning circuitry and connections to the electrodes within the fingertip itself. This may greatly reduce the number of electrical connections that may be made to transmit the data from the tactile sensor array to whatever controller requires those data. The above-described method of forming the core by pouring and polymerizing the core material may be particularly well-suited for creating a rugged protective enclosure around such signal conditioning circuitry, which may obviate the need for bulky and expensive hermetic packaging and feedthroughs for the electronic circuitry. The material chosen for the core should be relatively impermeable to the fluid chosen to inflate the fingertip.

The measuring of the overall hydrostatic pressure and/or the temperature of the fluid in the fingertip has also been found useful. A pressure transducer may easily be incorporated into a "tee" off the capillary tube that may otherwise be used to fill the fingertip with fluid. Thermistors, thermocouples or other temperature sensitive elements may easily be incorporated onto the surface of the core by affixing them to the inside surface of the mold as described above for the electrode contacts. The temperature information could be used for both of the haptic characterization of external objects and for calibrating the tactile sensors themselves to compensate for the effects of temperature on the conductivity of the fluid in the fingertip. The pressure information may provide additional information about the amount of distortion of the skin that might have occurred during active touch. With appropriate filtering and amplification, the pressure sensor can be made particularly sensitive to the sort of low amplitude, high frequency vibration that normally accompanies haptic exploration of textured surfaces by fingertips that have external dermal ridges. It can also be used to monitor the need to refill the fingertip if some fluid has leaked or diffused away.

Aspects of Signal Processing

We have described the different factors that may simultaneously affect the output of each sensor in the array. For example, at a given distance of skin compression, the measured impedance of the sensor may depend on both the radius of curvature and the force applied by the contacting object. This suggests that they cannot be distinguished. In fact, during haptic exploration, the magnitude and history of skin compression may depend on the active movement of the finger, as controlled by the operator. The operator may typically make several probing movements, perhaps at different velocities and perhaps with different parts of the fingertip, which has a complex shape with a broad range of curvatures in different portions. By looking at the temporal patterns of sensor signals and deconvolving them with the actual movements made to obtain them, the operator can extract a wealth of information. Such strategies have been described in the psychophysical literature regarding human haptic perception, but they appear not to have been applied to artificial tactile sensing arrays, probably because most such arrays lack the complex, biomimetic behavior that we have been able to achieve with our technology.

The previous description of the disclosed embodiments is provided to enable any person skilled in the art to make or use the tactile sensory systems and methods. Various modifications to these embodiments will be readily apparent to those skilled in the art, and the generic principles defined herein may be applied to other embodiments without departing from the spirit or scope of the tactile sensory systems and methods. Thus, the tactile sensory systems and methods are not intended to be limited to the embodiments shown herein but are to be accorded the widest scope consistent with the principles and novel features disclosed herein.

The invention claimed is:

1. A biomimetic tactile sensor system comprising:
    a biomimetic tactile sensor comprising:
        a deformation sensor comprising:
            a rigid core having a substantially convex surface;
            an elastic covering attached to the rigid core and substantially surrounding the surface;
            a multiplicity of electrodes on the surface of the rigid core; and
            a weakly conductive fluid between the electrodes and the elastic covering; and
    a controller configured to control movement of a prosthetic hand or robotic manipulator that is attached to the biomimetic tactile sensor in response to contact between the biomimetic tactile sensor and an external object in a manner at least partially comparable to the way in which a human brain would control the movement of a human fingertip in response to contact between the human fingertip and the external object.

2. The biomimetic tactile sensor system of claim 1 wherein the biomimetic tactile sensor further comprises a pressure transducer in contact with the weakly conductive fluid which is configured to sense vibration of the elastic covering as it slides over a surface of the external object that propagates through the deformable liquid material to the pressure transducer.

3. The biomimetic tactile sensor system of claim 2 wherein the controller is configured to determine changes in the volume of the weakly conductive fluid between the rigid core and the elastic covering based on information from the pressure transducer.

4. The biomimetic tactile sensor system of claim 2 wherein the outer surface of the elastic covering has a pattern of ridges that are configured to enhance the vibration of the elastic covering as it slides over the surface.

5. The biomimetic tactile sensor system of claim 2 wherein the controller is configured to infer a texture property of the surface of the object based on the vibration sensed by the pressure transducer as the elastic covering slides over the external object.

6. The biomimetic tactile sensor system of claim 1 wherein the biomimetic tactile sensor includes a temperature sensor.

7. The biomimetic tactile sensor system of claim 6 including a heating element configured to heat the rigid core.

8. The biomimetic tactile sensor system of claim 6 wherein the deformation sensor has a temperature dependency and wherein the controller is configured to correct for the temperature dependency of the deformation sensor based on a temperature measured by the temperature sensor.

9. The biomimetic tactile sensor system of claim 6 wherein the controller is configured to infer a thermal property of the external object from a time course of temperature measurements made by the temperature sensor.

10. The biomimetic tactile sensor system of claim 1 wherein the controller is configured to control the movement of the prosthetic hand or robotic manipulator in a manner that increases information about the external object that can be extracted from the biomimetic tactile sensor.

11. The biomimetic tactile sensor system of claim 1 wherein the deformation sensor is configured to sense deformation by sensing changes in the electrical resistance in a circuit that includes at least one of the electrodes and the weakly conductive fluid.

12. The biomimetic tactile sensor of claim 1 wherein the deformation sensor is configured to combine and convert signals from all of the electrodes into a single, serial digital output.

13. The biomimetic tactile sensor system of claim 1 wherein the controller is configured to formulate a hypothesis about properties of the object based on information from the biomimetic tactile sensor.

14. The biomimetic tactile sensor system of claim 13 wherein the controller is configured to test the hypothesis by directing a subsequent exploratory movement of the prosthetic hand or robotic manipulator and comparing information from the biomimetic tactile sensor resulting from the exploratory movement to information which would be expected from the biomimetic tactile sensor if the hypothesis is correct.

15. The biomimetic tactile sensor system of claim 1 wherein the controller is configured to determine the hardness of the object based on information from the deformation sensor and information about the relative velocity of motion between the deformation sensor and the object.

16. The biomimetic tactile sensor system of claim 1 further comprising a neural network configured to process information from the biomimetic tactile sensor.

17. The biomimetic tactile sensor system of claim 16 wherein the neural network is configured to provide an estimate of the location, magnitude and direction of force asserted by the external object against the elastic covering based on the information.

18. The biomimetic tactile sensor system of claim 16 wherein the neural network is configured to produce information indicative of an adjustment to a grip force to be asserted by the prosthetic hand or robot manipulator based on the estimate of the location, magnitude and/or direction of the force.

19. The biomimetic tactile sensor system of claim 1 wherein the movement is an exploratory movement to determine the identity or nature of the object and the controller is configured to adjust the exploratory movement according to information from the deformation sensor.

20. The biomimetic tactile sensor system of claim 1 wherein the movement control which the controller is configured to provide includes controlling the force with which the prosthetic hand or the robotic manipulator grips the external object.

21. A biomimetic tactile sensor system comprising:
    a biomimetic tactile sensor comprising:
        a deformation sensor comprising:
            a rigid core having a substantially convex surface;
            an elastic covering attached to the rigid core and substantially surrounding the surface;
            a multiplicity of electrodes on the surface of the rigid core; and
            a weakly conductive fluid between the electrodes and the elastic covering; and a pressure transducer in contact with the weakly conductive fluid which is configured to sense pressure asserted by the weakly conductive fluid; and a controller configured to control movement of a prosthetic hand or robotic manipulator that is attached to the biomimetic tactile sensor in response to contact between the biomimetic tactile sensor and an external object based on information from the deformation sensor and the pressure transducer.

22. The biomimetic tactile sensor system of claim 21 wherein the controller is configured to infer texture properties of a surface on the external object which contacts the elastic covering based on vibration detected by the pressure transducer.

23. The biomimetic tactile sensor system of claim 21 wherein the controller is configured to detect slippage between the external object and the biomimetic tactile sensor based on information from the pressure transducer.

24. The biomimetic tactile sensor system of claim 21 wherein the controller is configured to control the force with which the prosthetic hand or the robotic manipulator grips the external object.

25. The biomimetic tactile sensor system of claim 21 wherein the movement control which the controller is configured to provide includes exploratory movements to identify properties of the external object.

26. A biomimetic tactile sensor system comprising:
a biomimetic tactile sensor comprising:
a deformation sensor comprising:
a rigid core having a substantially convex surface;
an elastic covering attached to the rigid core and substantially surrounding the surface;
a multiplicity of electrodes on the surface of the rigid core; and
a weakly conductive fluid between the electrodes and the elastic covering; and
a temperature sensor; and
a controller configured to control movement of a prosthetic hand or robotic manipulator that is attached to the biomimetic tactile sensor in response to contact between the biomimetic tactile sensor and an external object based on information from the deformation sensor and the temperature sensor.

27. The biomimetic tactile sensor system of claim 26 wherein the movement control which the controller is configured to provide includes exploratory movements to identify properties of the external object.

28. The biomimetic tactile sensor system of claim 27 wherein the controller is configured to infer thermal properties of the external object from a time course of temperature measurements made by the temperature sensor.

29. The biomimetic tactile sensor system of claim 26 including a heating element configured to heat the rigid core.

30. The biomimetic tactile sensor system of claim 26 wherein the deformation sensor has a temperature dependency and wherein the controller is configured to correct for the temperature dependency of the deformation sensor based on a temperature measured by the temperature sensor.

* * * * *